United States Patent
Miura et al.

(10) Patent No.: US 7,136,978 B2
(45) Date of Patent: Nov. 14, 2006

(54) SYSTEM AND METHOD FOR USING DYNAMIC RANDOM ACCESS MEMORY AND FLASH MEMORY

(75) Inventors: Seiji Miura, Hachioji (JP); Kazushige Ayukawa, Kokubunji (JP); Tetsuya Iwamura, Akiruno (JP)

(73) Assignee: Renesas Technology Corporation, Tokyo (JP)

(*) Notice: Subject to any disclaimer, the term of this patent is extended or adjusted under 35 U.S.C. 154(b) by 394 days.

(21) Appl. No.: 10/445,922

(22) Filed: May 28, 2003

(65) Prior Publication Data
US 2004/0049629 A1 Mar. 11, 2004

(30) Foreign Application Priority Data
Sep. 11, 2002 (JP) .................. P2002-265334

(51) Int. Cl.
G06F 12/00 (2006.01)
G06F 12/02 (2006.01)
G06F 12/16 (2006.01)

(52) U.S. Cl. .................. 711/165; 711/170; 711/5; 711/103; 711/105; 714/6; 365/230.03; 365/51

(58) Field of Classification Search .................. 711/5, 711/103, 105, 149; 365/185.11, 230.03, 365/230.05
See application file for complete search history.

(56) References Cited

U.S. PATENT DOCUMENTS

| | | | |
|---|---|---|---|
| 6,392,950 B1 | 5/2002 | Ayukawa et al. | |
| 6,411,561 B1* | 6/2002 | Ayukawa et al. | 365/230.03 |
| 6,587,393 B1* | 7/2003 | Ayukawa et al. | 365/230.03 |
| 6,791,877 B1* | 9/2004 | Miura et al. | 365/185.11 |
| 6,847,575 B1* | 1/2005 | Ayukawa et al. | 365/230.03 |
| 2002/0199056 A1* | 12/2002 | Ayukawa et al. | 711/106 |
| 2003/0028733 A1* | 2/2003 | Tsunoda et al. | 711/154 |
| 2004/0049629 A1* | 3/2004 | Miura et al. | 711/105 |
| 2004/0223366 A1* | 11/2004 | Miura et al. | 365/154 |
| 2005/0232059 A1* | 10/2005 | Miura et al. | 365/230.03 |

FOREIGN PATENT DOCUMENTS

| | | |
|---|---|---|
| EP | 0 566 306 A2 | 4/1993 |
| JP | 5-299616 | 4/1992 |
| JP | 7-146820 | 4/1994 |
| JP | 8-137736 | 11/1994 |
| JP | 2001-510612 | 10/1997 |
| JP | 2001-005723 | 6/1999 |

(Continued)

OTHER PUBLICATIONS

"Data Sheet of Combination Memory (Stacked CSP), Flash Memory + RAM," Model LRS1380, Sharp Corporation, Jun. 5, 2001, pp. 1-36, reference pp. i-iv.

*Primary Examiner*—Brian R. Peugh
*Assistant Examiner*—Jesse Diller
(74) *Attorney, Agent, or Firm*—Reed Smith LLP; Stanley P. Fisher, Esq.; Juan Carlos A. Marquez, Esq.

(57) ABSTRACT

A system and method are provided for using dynamic random access memory and flash memory. In one example, the memory system comprises a nonvolatile memory; synchronous dynamic random access memories; circuits including a control circuit which is coupled with the nonvolatile memory and the synchronous dynamic random access memories, and controls accesses to the nonvolatile memory and the synchronous dynamic random access memories; and a plurality of input/output terminals coupled with the circuits, wherein in data transfer from the nonvolatile memory to the synchronous dynamic random access memories, error corrected data is transferred.

15 Claims, 29 Drawing Sheets

FOREIGN PATENT DOCUMENTS

| | | | | | |
|---|---|---|---|---|---|
| JP | 2001-357684 | 6/2000 | WO | WO 98/29816 | 10/1997 |

* cited by examiner

FIG. 12A
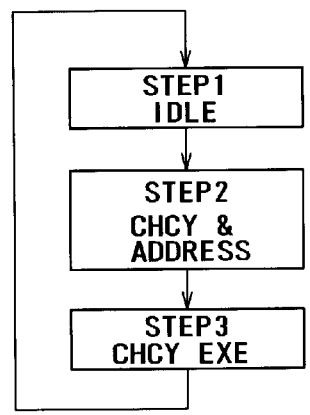
FIG. 12B
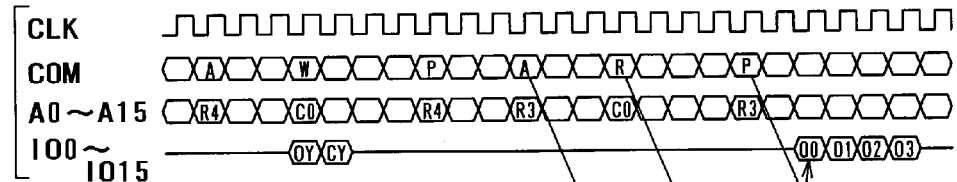
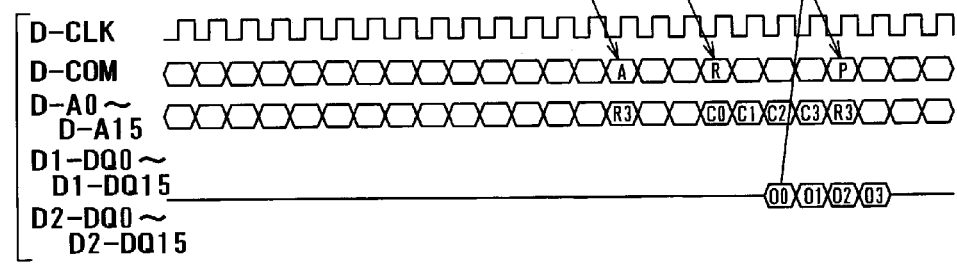

F I G. 2 4
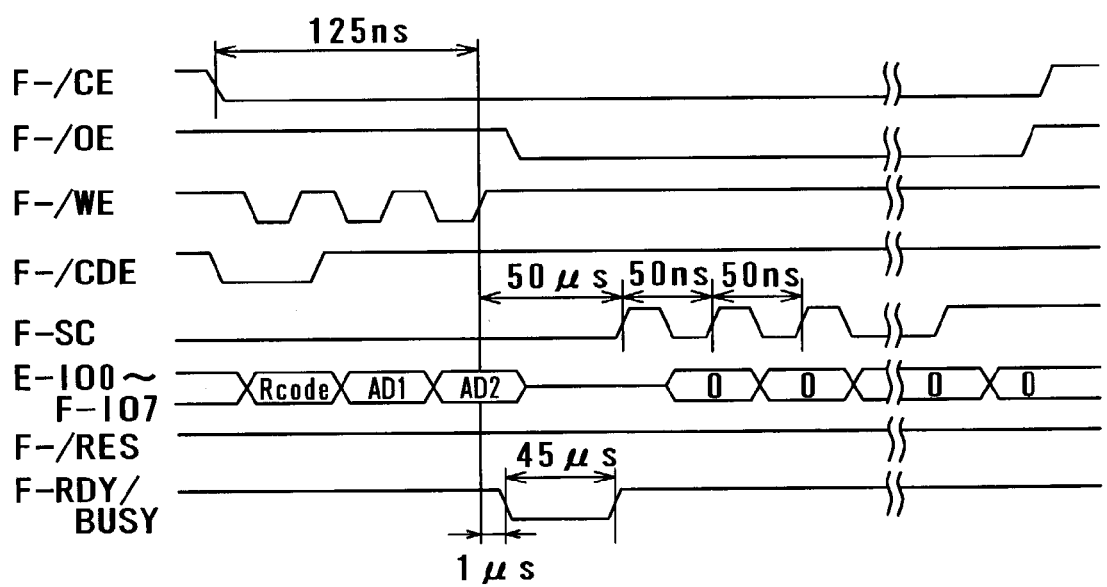

SYSTEM AND METHOD FOR USING DYNAMIC RANDOM ACCESS MEMORY AND FLASH MEMORY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to computer memory systems and, more particularly, to memory systems having dynamic random access memories (DRAMs) and to control methods such memory systems.

2. Discussion of Background

There are conventionally combination semiconductor memories wherein flash memory (capacity: 32 megabits) and static random access memory (SPAM (capacity: 4 megabits)) on a stack chip (stack) are integrally sealed in an FBGA (Fine pitch Ball Grid Array) package. The flash memory and the SRAM use the input/output electrodes of the FBGA package for address input terminals and data input/output terminals in common. However, the control terminals of one of them is independent of those of the other.

There are also combination semiconductor memories wherein a flash memory chip and DRAM chips are integrally sealed in a lead frame-type package. In this type of combination semiconductor memory, the flash memory and the DRAMs use the input/output electrodes of the package for address input terminals, data input/output terminals, and control terminals in common for input/output.

There are also systems consisting of flash memory which is treated as main storage, cache memory, a controller, and CPU. There are also semiconductor memories consisting of flash memory, DRAM, and a data transfer control circuit (data transfer controller). There are also memories wherein flash memory and SRAM are packaged on one and the same semiconductor chip. There are also flash I/O cards wherein flash memory and SRAM are packaged. There are also systems consisting of flash memory, cache memory, a controller, and CPU. Some of these systems are provided in more detail in the following references. "Data Sheet of Combination Memory (Stacked CSP), Flash Memory+ RAM," Model LRS1380, [online], Dec. 10, 2001, Sharp Corporation, [Retrieved on Aug. 21, 2002], Internet URL: <http://www.sharp.co.jp/products/device/flash/cmlist.html>. JP-A No. 299616/1993 official gazette. Specification for European Patent No. 0566306 laid open. JP-A No. 146820/1995 official gazette. JP-A No. 5723/2001 official gazette. JP-A No. 357684/2001 official gazette. JP-A No. 137736/1996 official gazette. JP-A No. 510612/2001 official gazette.

The sizes of applications, data, and work areas used in cellular phones have been increased due to an increase in functions added to the cellular phones (e.g. delivering of music, game, etc.). It is expected that flash memories and SRAMs with higher capacities will be required. Further, the performance of recent cellular phones has been remarkably enhanced, and needs for large-capacity memories have grown.

Flash memories presently used in cellular phones are NOR-type flash memories using a memory array method called NOR configuration. The NOR configuration is an array configuration with the reduced parasitic resistance of memory cell array. In the NOR configuration, the resistance is reduced by providing metal bit line contacts at a rate of one contact to two memory cells connected in parallel. On this account, the read time is about 80 ns, which is substantially equal to the read time in SRAMs. However, since one contact must be provided for two cells, the proportion of the contact portion to the chip area is high and the area of one bit per memory cell is increased. This poses a problem in that needs for higher capacity cannot be achieved.

Also, typical large-capacity flash memories include AND-type flash memory which uses AND configuration for memory array, and NAND-type flash memory which uses NAND configuration. In these flash memories, one bit line contact is provided for 16 to 128 cells, and high-density memory arrays are obtained. Therefore, the area of one bit per memory cell can be made smaller than that in NOR-type flash memories, and needs for higher capacities can be achieved. On the other hand, the read time before the first data is outputted is as long as about 25 μs to 50 μs. Unfortunately, this read time would impair compatibility with SRAMs.

SUMMARY OF THE INVENTION

An object of the present invention is to provide a memory system including ROM and RAM, wherein the memory system is high in storage capacity and allows reading and writing at high speed.

Typical means for the present invention are as follows: a flash memory, a transfer data buffer (TDBUF), and two DRAMs which consist of a plurality of memory banks and from and to which reading and writing are affected according to commands in synchronization with a clock are packaged in one sealing body, and the sealing body is provided with electrodes for interconnection with a semiconductor chip and electrodes for connection between the sealing body and the outside of the sealing body.

In one embodiment, a memory controller is connected with the DRAMs and with the flash memory for shortening the read time in response to requests from the outside of the semiconductor device to read data out of the flash memory, and data transfer from the flash memory to the DRAMs and from the DRAMs to the flash memory is effected by the memory controller. After power is turned on or when a transfer command is issued, it is advisable to exercise such control that at least part of data in the flash memory is transferred to the DRAMs by the memory controller.

It is also advisable to exercise such control that, even when data transfer is being made between the flash memory and the DRAMs within the semiconductor device, read and write accesses to the DRAMs from the outside of the semiconductor device are accepted for reading and writing data at higher speed. It is advisable to ensure that data transfer between the flash memory and the DRAMs within the semiconductor device can be effected in the background.

Further, the memory controller exercises refresh control on the DRAMs during data transfer from the flash memory to the DRAMs after power is turned on. It is advisable to exercise such control that auto refresh is performed on the DRAMs during the data transfer from the flash memory to the DRAMs, the DRAMs are brought into self refresh state when data transfer completes, and thereafter, the self refresh state is canceled according to a self refresh cancellation command from the outside of the semiconductor device.

The invention encompasses other embodiments of a system, a method, and an apparatus, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 4 is a drawing illustrating an example of the operation of the memory module to which the present invention is applied, performed when power is turned on;

FIG. 5 is a drawing illustrating an example of the initialization of DRAMs in the memory module to which the present invention is applied, performed when power is turned on;

FIG. 6 is a drawing illustrating an example of the initialization of DRAMs in the memory module to which the present invention is applied, performed when power is turned on;

FIG. 7 is a drawing illustrating the flow of operation of data transfer from FLASH to DRAMs in the memory module to which the present invention is applied, performed when power is turned on;

FIG. 12A is a drawing illustrating an example of the operation of changing a clock cycle on the memory module of the present invention;

FIG. 12B is a drawing illustrating an example of the operation of changing a clock cycle on the memory module of the present invention;

FIG. 24 is a timing chart illustrating an example of the timing of reading data from FLASH illustrated in FIG. 23;

DESCRIPTION OF THE PREFERRED EMBODIMENTS

An invention for a system and method for using dynamic random access memory and flash memory is disclosed. Numerous specific details are set forth in order to provide a thorough understanding of the present invention. It will be understood, however, to one skilled in the art, that the present invention may be practiced without some or without all of these specific details.

Referring to the attached drawings, embodiments of the present invention will be described in detail below. The circuit elements comprising each block in the embodiments are formed on one semiconductor substrate of single-crystal silicon or the like by a publicly known integrated circuit technology, such as CMOS (complementary MOS transistor) technology without confinement thereto.

Figure 1:
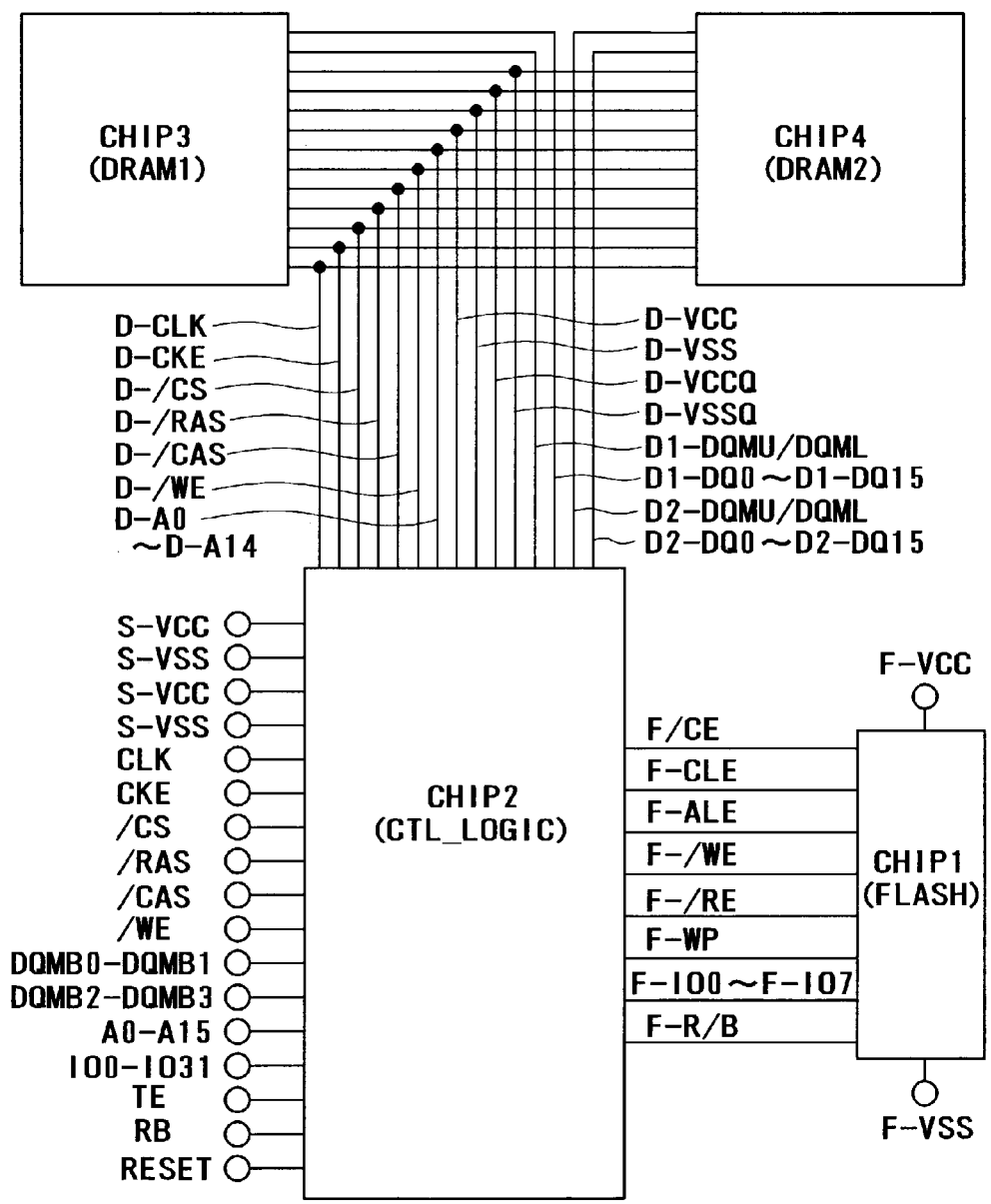
FIG. 1 is a schematic diagram of a memory module to which the present invention is applied.

FIG. 1 illustrates a first embodiment of a memory module which is an example of the application of the memory system related to the present invention. The memory module consists of four chips. Each of the chips will be described below.

First, CHIP1 (flash memory, hereafter referred to as "FLASH") is a nonvolatile memory. For the nonvolatile memory, ROM (Read-Only Memory), EEPROM (Electrically Erasable and Programmable ROM), flash memory, or the like can be used. Flash memory will be taken as an example for the embodiment. CHIP2 (CTL_LOGIC) includes a control circuit which controls CHIP1, CHIP3, and CHIP4. CHIP3 and CHIP4 are dynamic random access memories (DRAMs). There are various types of DRAM, including EDO (Extended Data Out), SDRAM (Synchronous DRAM), and DDR (Double Data Rate), depending on differences in internal constitution and interface. Any DRAM is applicable to the memory module but SDRAM will be taken as an example for the description of the embodiment.

To the memory module, addresses (A0 to A15), clock signals (CLK), and command signals (CKE, /CS, /RAS, /CAS, /WE) are inputted. Power is supplied through S-VCC, S-VSS, L-VCC, L-VSS, F-VCC, F-VSS, D-VCC, and D-VSS and IO0 to IO31 are used to input/output data. This memory module is operated through a so-called SDRAM interface.

CHIP2 supplies signals required for the operation of CHIP1, CHIP3, and CHIP4. CHIP2 supplies CHIP1 with addresses, data for FLASH (F-IO0 to F-IO7), and commands (F-CE, F-/CLE, F-/ALE, F-/WE, F-/RE, F-WP, F-R/B). Further, CHIP2 supplies CHIP3 and CHIP4 with a clock (D-CLK), addresses (D-A0 to D-A14), commands (D-CKE, D-/CS, D-/RAS, D-/CAS, D-/WE, D1-DQMU/DQML, D2-DQMU/DQML), and data for DRAMs (D1-DQ0 to D1-DQ15, D2-DQ0 to D2-DQ15).

Each command signal will be briefly described here. Of signals inputted to CHIP2, CLK is clock signal; CKE is clock enable signal; /CS is chip select signal; /RAS is row address strobe signal; /CAS is column address strobe signal; /WE is write enable signal; and DQMB0, QMB1, DQMB2, and DQMB3 are input/output mask signals.

Of signals inputted to CHIP3 and CHIP4, D-CLK is clock signal; D-CKE is clock enable signal; D-/CS is chip select signal; D-/RAS is row address strobe signal; D-/CAS is column address strobe signal; D-/WE is write enable signal; D1-DQMU/DQML and D2-DQMU/DQML are input/output mask signals.

Of signals inputted to CHIP1, F-/CE is chip enable signal; F-/CLE is command latch enable signal; F-ALE is address latch enable signal; F-/WE is write enable signal; F/RE is read enable signal; F-WP is write protect signal; F-R/B is ready/busy signal; and F-IO0 to F-IO7 are input/output signals and used to input addresses and to input/output data.

The control circuit (CTL_LOGIC) on CHIP2 selects control registers formed in the control circuit (CTL_LOGIC) on CHIP2, DRAMs on CHIP3 and CHIP4, or FLASH on CHIP1 according to the value of an address externally inputted.

By setting values on the control registers formed in the control circuit (CTL_LOGIC), it can be judged whether an access from the outside is access to the control registers, access to DRAMs, or access to FLASH. Any access is made by an SDRAM interface method.

FLASH is partitioned into initial program area, main data area, and replacement area without confinement thereto. In part of the initial program area, initial program area specification data which indicates the range of the initial program area is stored.

The initial program area specification data can be rewritten from the outside of the memory module through addresses (A0 to A15) and command signals (CKE, /CS, /RAS, /CAS, /WE).

The DRAMs are partitioned into work area and FLASH data copy area without confinement thereto. The area for work is used as work memory when a program is executed and the FLASH data copy area is used as memory for copying data from FLASH.

Correlation between the addresses in FLASH and the addresses in the FLASH data copy area in DRAMs can be determined by a memory management circuit formed in the control circuit on CHIP2. For example, in general, SDRAM consists of four memory banks (Banks 0 to 3) and, through the memory management circuit, the FLASH data copy area in DRAMs can be allocated to Bank 3 and Bank 2 and the work area can be allocated to Bank 1 and Bank 0 without confinement thereto.

The sequence of operation at power-on will be described. When power to the memory module is turned on, the control circuit on CHIP2 initializes DRAMs, and then reads out the initial program area specification data in FLASH. Then, the data in FLASH in the range indicated by the initial program area specification data in FLASH is transferred to the FLASH data copy area in DRAMs.

As mentioned above, the memory module can be accessed as soon as a portable device starts up by automatically transferring minimum required data from FLASH to DRAMs when power is turned on, and this contributes to the enhancement of the performance of the device.

Further, since the initial program area specification data can be rewritten to change the size of data transferred at power-on, the requirements of portable devices can be flexibly met, and this also contributes to the enhancement of the performance of the devices.

With respect to data transfer between FLASH and DRAMs after the completion of the sequence of operation at power-on, data in FLASH can be copied (loaded) to the FLASH data copy area in DRAMs or data in the FLASH data copy area in DRAMs can be written back to (stored in) FLASH by accessing the control registers in the control circuit on CHIP2 and writing a load command or store command code therein.

When an address to access the control registers is inputted through address signals (A0 to A15), a write command is inputted through command signals (CKE, /CS, /RAS, /CAS, /WE), and a load command code, a load start address, a load end address are inputted through input/output data signals (D-IO0 to -D-IO15), the load command code, the load start address, and transfer data size are written into the control registers. Thereafter, data equivalent to the transfer data size is read out of FLASH at the load start address and transferred to the FLASH data copy area in DRAMs. Thus, the data from FLASH is retained in DRAMs.

In the same way as data transfer between FLASH and DRAMs according to a load command, when a store command code, a store start address, and transfer data size are written into the control registers through command signals (CKE, /CS, /RAS, /CAS, /WE) and address signals (A0 to A15), data equivalent to the transfer data size in DRAMs at the store start address is written into FLASH.

The reliability of FLASH is degraded by repeated writing, and data written during writing and corresponding data read can differ or data can fail to be written during rewriting on rare occasions.

When the control circuit on CHIP2 reads data from FLASH, the control circuit detects and corrects any error in read data and then transfers the corrected data to DRAMs. When the control circuit on CHIP2 writes data into FLASH, the control circuit checks whether the data is correctly written and, if not, writes the data at an address other than the present address. That is, the control circuit performs so-called replacement processing. The control circuit also exercises address management wherein defect addresses and replacement processing performed from the defect addresses to other addresses are managed.

To access the FLASH data copy area in DRAMs, an address to select the FLASH data copy area is inputted through address signals (A0 to A15) and a read command or write command is inputted through command signals (CKE, /CS, /RAS, /CAS, /WE). Then, the command and the address are decoded, and access to the FLASH data copy area in DRAMs is made to read or write data from or into the area.

Thus, the times for reading and rewriting data held in the FLASH data copy area in DRAMs become equal to those for reading and rewriting data in the other areas in DRAMs.

To access the work area in DRAMs, an address to select the work area is inputted through address signals (A0 to A15) and a read command or write command is inputted through command signals (CKE, /CS, /RAS, /CAS, /WE). Then, the command and the address are decoded, and access to the work area in DRAMs is made to read or write data from or into the area.

In general, SDRAM consists of four memory banks, Bank 0 to Bank 3, and a minimum time interval Tint-min which is a time period until a bank becomes accessible after the completion of access to another bank is prescribed.

The assumption is made that the FLASH data copy area in DRAMs is allocated to Bank 3 and Bank 2 and the work area is allocated to Bank 1 and Bank 0 through the memory management circuit. If access to Bank 0 of DRAMs is made from the outside of the memory module through address signals (A0 to A15) and command signals (CKE, /CS, /RAS, /CAS, /WE) when access to Bank 3 of DRAMs is being made in the memory module according to a load command or store command, the control circuit on CHIP2, using the above minimum time interval Tint-min, causes the access to DRAMs according to the load command or store command to pause, makes access through address signals (A0 to A15) and command signals (CKE, /CS, /RAS, /CAS, /WE), and, after the completion of this access, resumes the access according to the load command or store command.

In case of read access, read data from DRAMs is outputted to data input/output lines (I/O0 to I/O31) through data I/O for DRAM (D1-DQO to D1-DQ15). In case of write access, write data is inputted through the data input/output lines (I/O0 to I/O31) of the memory module, and thereafter inputted to DRAMs through data I/O for DRAMs (D1-DQO to D1-DQ15, D2-DQ0 to D2-DQ15).

Figure 2:
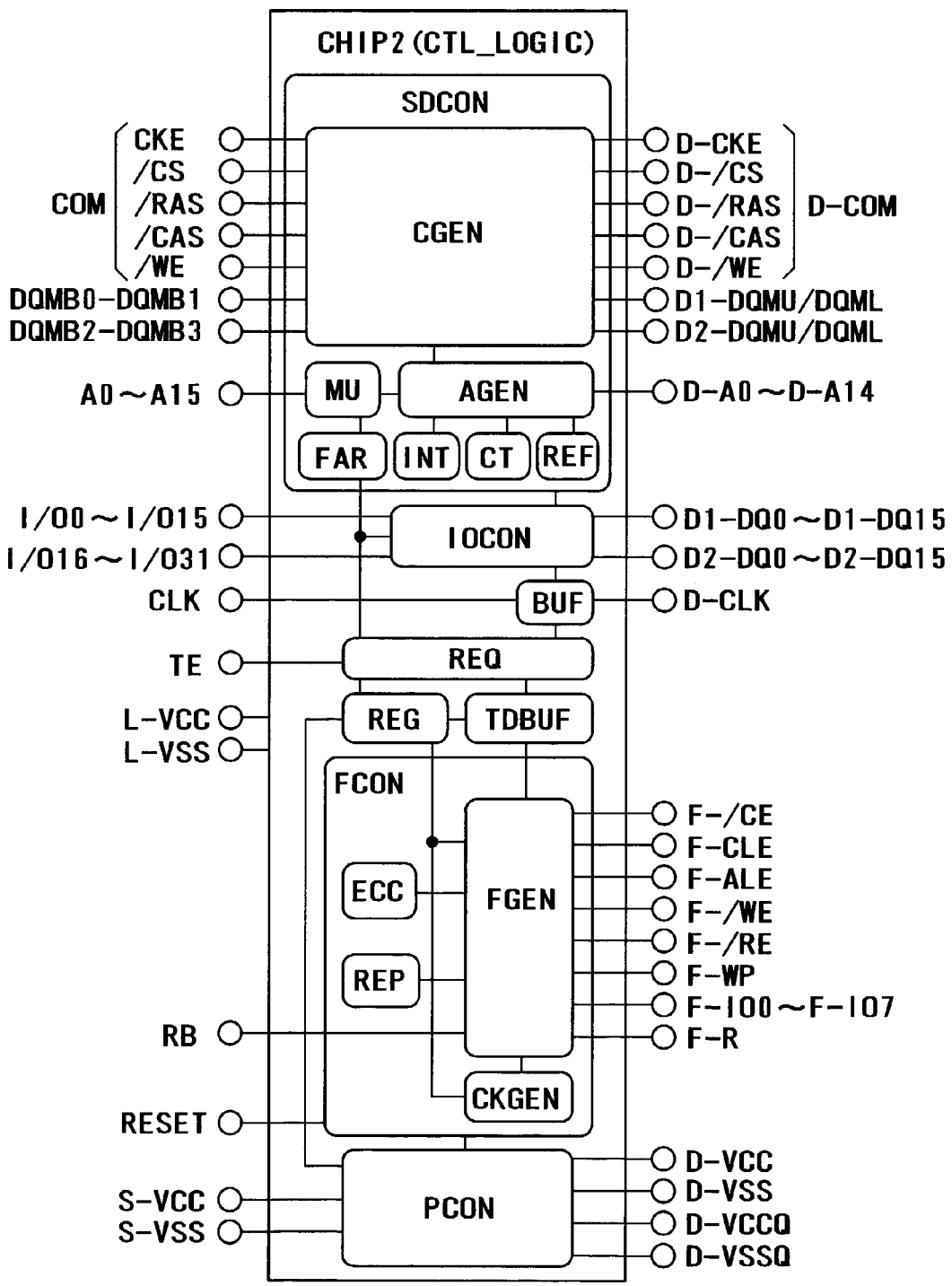
FIG. 2 is a block diagram illustrating an example of CHIP2 in FIG. 1.

FIG. 2 shows the elements of control circuit CHIP2 (CTL_LOGIC). Each of the circuit blocks will be described below.

A DRAM control circuit SDCON consists of the memory management circuit MU, a command generator CGEN, an address generator AGEN, an access arbiter FAR, an initialize circuit TNT, a counter circuit CT, and a refresh control circuit REF. The initialize circuit TNT initializes DRAMs when power supply to DRAMs is started.

The memory management circuit MU converts addresses externally inputted, and selects the control registers, the FLASH data copy area in DRAMs, the work area in DRAMs, or FLASH. The access arbiter FAR coordinates accesses between FLASH and DRAMs.

The counter circuit CT increments address signals (A0 to A15) one by one according to burst length set through address signals (A0 to A15) or command signals COM (CKE, /CS, /RAS, /CAS, /WE). The command generator CGEN issues commands to read or write data and the like to DRAMs. The address generator AGEN issues addresses to DRAMs.

An I/O data control circuit IOCON controls the timing of reading and writing data from and to DRAMs. A buffer circuit BUF generates from a clock CLK a clock for internal control for the DRAM control circuit SDCON and the IO data control circuit IOCON and a clock D-CLK for DRAMs.

An access request circuit REQ retains an initial address ADauto for reading initial program area specification data indicating the range of an initial program, stored in FLASH, to be automatically transferred from FLASH to DRAMs when power is turned on. When power is turned on, the initial program area specification data is read out of FLASH at the initial address ADauto, and, in order to transfer the data in the range indicated by the initial program area specification data from FLASH to DRAMs, the access request circuit REQ issues a transfer request to a flash control circuit FCON and the DRAM control circuit SDCON. Further, the access request circuit REQ issues a transfer request for data transfer between DRAMs and FLASH according to a load command or store command.

FLASH is partitioned into initial program area, main data area, and replacement area without confinement thereto. In part of the initial program area, initial program area specification data indicating the range of the initial program area is stored. The initial program area specification data can be rewritten from the outside of the memory module through addresses (A0 to A15) and command signals (CKE, /CS, /RAS, /CAS, /WE).

The DRAMs have such a property that data retained in the memory cells will vanish sooner or later unless refresh is periodically performed. To cope with this, the refresh control circuit REF performs auto refresh on DRAMs while initial data is being transferred from FLASH to DRAMs immediately after power is turned on. When the initial data transfer completes, the refresh control circuit REF further performs self refresh on DRAMs to retain the data in DRAMs. In self refresh state, data can be retained with lower power than in ordinary auto refresh. The self refresh state established by the refresh control circuit is canceled when a self refresh cancellation command is inputted through address signals (A0 to A15) and command signals COM (CKE, /CS, /RAS, /CAS, /WE), and, at the same time, refresh control is switched from control by the refresh control circuit REF to control through address signals (A0 to A15) and command signals (CKE, /CS, /RAS, /CAS, /WE).

In the control registers REG, command codes, such as load commands, store commands, cycle time change commands, power supply interrupt commands, and power-on commands, transfer start address, transfer data size, and the like are written and retained without confinement thereto.

The transfer data buffer TDBUF temporarily stores data during data transfer between DRAMs and FLASH.

The flash control circuit FCON consists of a flash control signal generation circuit FGEN, a clock generation circuit CKGEN, an error correction circuit ECC, and an address replacement circuit REP.

When a RESET signal is removed after power is turned on, the clock generation circuit CKGEN generates a clock for the flash control signal generation circuit FGEN.

The error correction circuit ECC checks whether data read out of FLASH has an error and corrects an error, if any. The address replacement circuit REP checks whether writing to FLASH is correctly performed and, if not, performs writing at a new address for substitution previously provided in FLASH. The flash control signal generation circuit FGEN controls reading and writing of data at FLASH.

A power control circuit PCON supplies power to DRAMs and controls the power supply.

Next, the operation of the present memory module will be described.

When power is turned on through L-VCC, L-VSS, S-VCC, and S-VSS, CHIP2 is initialized by a reset signal RESET. When the reset is canceled, power supply to DRAMs is started and the initialize circuit INT initializes DRAMs.

Automatic transfer of the initial program from FLASH to DRAMs thereafter executed will be described.

The access request circuit REQ retains the initial address ADauto for reading the initial program area specification data stored in FLASH and indicating the range of the initial program to be automatically transferred from FLASH to DRAMs when power is turned on.

After power is turned on, the access request circuit REQ issues to the flash control signal generation circuit FGEN a request to read the data at the above initial address ADauto. The flash control signal generation circuit FGEN reads the initial program area specification data stored in FLASH according to the instruction from the access request circuit REQ. Thereafter, the control circuit on CHIP2 transfers the program in the range indicated by the initial program area specification data from FLASH to DRAMs.

First, the flash control signal generation circuit FGEN performs the operation of reading from FLASH. If there is no error in the data read out of FLASH, the flash control signal generation circuit FGEN transfers the data directly to the transfer data buffer TDBUF. If there is any error, the data is corrected through the error correction circuit ECC, and the corrected data is then transferred to the transfer data buffer TDBUF.

Subsequently, the access request circuit REQ issues to the access arbiter FAR a request to transfer data for DRAMs, and, when permission is given to the transfer request, a write command and an address signal from the address and command generator ACGEN and the initial program from the IO data control circuit IOCON are written into DRAMs.

When the control registers REG are selected through address signals (A0 to A15) and command signals COM (CKE, /CS, /RAS, /CAS, /WE) and a load command is written into the control registers REG, data transfer from FLASH to DRAMs is started. First, the flash control signal generation circuit FGEN performs the operation of reading from FLASH. If there is no error in the data read out of FLASH, the data is transferred directly to the transfer data buffer TDBUF. If there is any error, the data is corrected through the error correction circuit ECC and the corrected data is then transferred to the transfer data buffer TDBUF.

Subsequently, the access request circuit REQ issues to the access arbiter FAR a request to transfer data for DRAMs, and, when permission is given to the transfer request, a write command and an address signal from the address and command generator ACGEN and data from the IO data control circuit IOCON are inputted to DRAMs, and thus desired data is written into DRAMs.

In FIG. 2, the error correction circuit ECC and the address replacement circuit REP are formed in the control circuit (CTL_LOGIC) on CHIP2. Alternatively, these circuits may be formed on CHIP1 (FLASH) so that errors are corrected on the FLASH side, the data is transferred to the DRAMs through the control circuit (CTL_LOGIC) on CHIP2, and data transferred from DRAMs to FLASH is subjected to replacement processing and written on the FLASH side.

When the control registers REG are selected through address signals (A0 to A15) and command signals COM (CKE, /CS, /RAS, /CAS, /WE) and a store command is written into the control registers, data transfer from DRAMs to FLASH is started. First, the access request circuit REQ issues to the access arbiter FAR a request to transfer data for DRAMs and, when an approval is given to the transfer request, a read command and an address signal are transmitted from the address command generator ACGEN to DRAMs, and thus the data is read.

The data read out of DRAMs is transferred to the transfer data buffer TDBUF through the IO data control circuit IOCON. The flash control signal generation circuit FGEN reads the data transferred to the transfer data buffer TDBUF and writes the data into FLASH.

The address replacement circuit REP checks whether writing successfully completes and, if so, terminates the processing. If writing fails, the address replacement circuit REP performs writing at a new address for substitution previously provided in FLASH. If the address replacement circuit REP performs replacement processing, the address replacement circuit REP retains and manages address information on the defect address and which address is substituted for the defect address.

To access the FLASH data copy area or the work area in DRAMs, an address to select the area and a read command or write command are inputted through address signals (A0 to A15) and command signals COM (CKE, /CS, /RAS, /CAS, /WE), respectively. The control circuit on CHIP2 decodes the command and the address and issues the address and a read command or write command to DRAMs through address signals (D-A0 to D-A14) and command signals D-COM (D-CKE, D-/CS, D-/RAS, D-/CAS, /D-WE) to read or write data.

In general, SDRAM consists of four memory banks, Bank 0 to Bank 3, and a minimum time interval Tint-min which is a time period until a bank becomes accessible after the completion of access to another bank is prescribed.

The assumption is made that the FLASH data copy area in SDRAMs is allocated to Bank 3 and Bank 2 and the work area is allocated to Bank 1 and Bank 0 through the memory management circuit. If access to Bank 0 of DRAMs is made from the outside of the memory module through address signals (A0 to A15) and command signals (CKE, /CS, /RAS, /CAS, /WE) when access to Bank 3 of DRAMs is being made in the memory module according to a load command or store command, the control circuit on CHIP2, using the above minimum time interval Tint-min, causes the access to DRAMs according to the load command or store command to pause, and thereafter issues the address and a read/write command to DRAMs through address signals (D-A0 to D-A14) and command signals D-COM (D-CKE, D-/CS, D-/RAS, D-/CAS, /D-WE) to read or write data in order to process the access through address signals (A0 to A15) and command signals (CKE, /CS, /RAS, /CAS, /WE). After the completion of this access, the control circuit on CHIP2 resumes the access according to the load command or store command.

As mentioned above, even when data transfer between FLASH and DRAMs according to a load command or store command is in progress within the memory module, DRAMs are accessible from the outside of the memory module without paying attention to this data transfer. This makes it possible to cope with needs for the enhancement of the performance of portable devices.

In other words, since data transfer between FLASH and DRAMs according to a load command or store command can be effected in the background, it is possible to transfer required data to DRAMs or FLASH before due time without paying attention to access from the outside of the memory module. This also makes it possible to cope with needs for the enhancement of the performance of portable devices.

To interrupt to power supply to DRAMs, a power supply interrupt command is written into the control registers REG through address signals (A0 to A15) and command signals COM (CKE, /CS, /RAS, /CAS, /WE). Thereafter, the power control circuit PCON stops power supply to DRAMs.

To restart the operation of DRAMs after power supply to DRAMs is once stopped, a power-on command-is written into the control registers REG through address signals (A0 to A15) and command signals COM (CKE, /CS, /RAS, /CAS, /WE).

Thereafter, the power control circuit PCON starts power supply to DRAMs, the initialize circuit INT initializes DRAMs, the access request circuit REQ issues an initial data transfer request, and thus initial data transfer from FLASH to DRAMs is effected.

Figure 3:
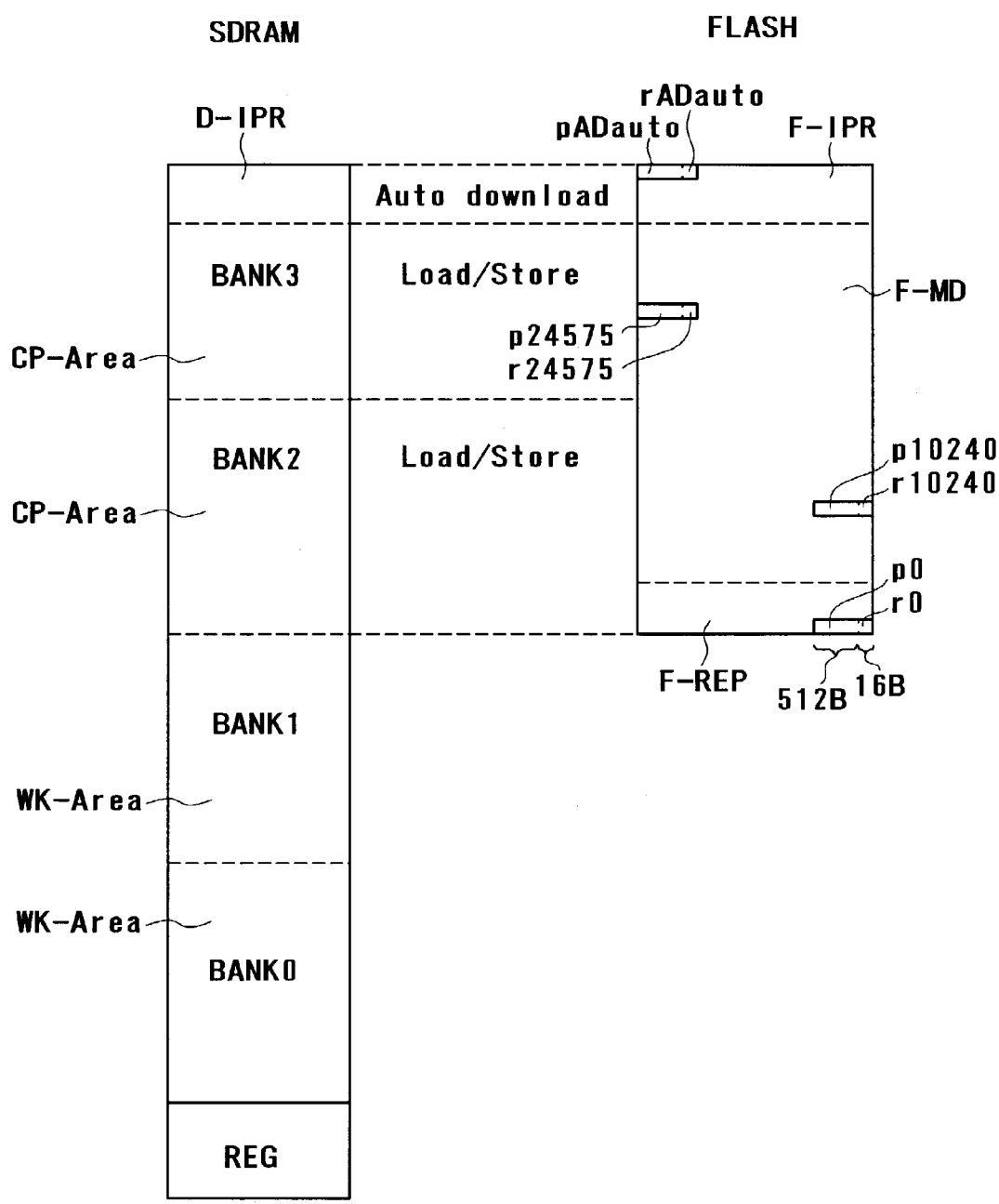
FIG. 3 is an explanatory diagram illustrating an example of the address map of the memory module to which the present invention is applied.

FIG. 3 illustrates an example of the memory map of the memory management circuit MU. With respect to this embodiment, a memory module with the 128+4-Mb storage area of nonvolatile memory, the 256-Mb storage area of DRAMs, and the 8-kb control registers REG will be taken as an example to describe a typical memory map, without confinement thereto.

FIG. 3 illustrates a memory map wherein addresses inputted through address signals A0 to A15 are converted into those of the control registers REG (8 kb), the work area WK-Area (128 Mbit) in DRAMs, the FLASH data copy area CP-Area (128 Mbit) in DRAMs, and FLASH (128 Mbit+4 Mb) through the memory management circuit MU.

The control registers REG and Bank 0 (BANK0), Bank 1 (BANK1), Bank 2 (BANK2), and Bank 3 (BANK3) of DRAMs are mapped in this order from the lower part of the address space of the memory map, without confinement thereto.

Bank 3 (BANK3) and Bank 2 (BANK2) of DRAMs are mapped to the FLASH data copy area CP-Area, and Bank 1 (BANK1) and Bank 0 (BANK0) are mapped to the work area WK-Area. The data copy area CP-Area is an area where data is transferred from FLASH and retained. The work area WK-Area is an area used as work memory.

To the initial program area D-IPR in Bank 3 (BANK3) of DRAMs, the program in the initial program area F-IPR in FLASH is transferred during initialization after power-on.

The FLASH is partitioned into initial program area F-IPR, main data area F-MD, and replacement area F-REP. In the initial program area F-TPR in FLASH, the initial program which is transferred to DRAMs when power is turned on is stored.

In the main data area F-MD, programs and data are stored. The reliability of FLASH is degraded by repeated rewriting, and data written during writing and corresponding data read can differ or data can fail to be written during rewriting on rare occasions. The replacement area F-REP is provided for replacing data in the faulty initial program area F-IPR or main data area F-MD to a new area. There is no restriction on the size of the replacement area but it is advisable to select such a size that the reliability guaranteed by FLASH can be ensured.

The page size of FLASH is 528 Bytes without confinement thereto. Of this size, 512 Bytes is a data area and the remaining 16 Bytes is a redundant area.

Data in the main data area F-MD and the replacement area F-REP in FLASH is transferred to the FLASH data copy area CP-Area, not to the initial program area D-IPR in Bank 3 (BANK3), according to a load command through address signals (A0 to A15) and command signals COM (CKE, /CS, /RAS, /CAS, /WE) as required.

Data transfer from FLASH to DRAMs at power-on will be described.

In the data area pADauto in FLASH, initial program area specification data Larea indicating the range of the initial program to be automatically transferred from FLASH to DRAMs when power is turned on is stored.

After power is turned on, the data pADauto in FLASH is read first. When the data is read out of FLASH, data located in the data area pADauto in FLASH and ECC parity data located in the redundant area rADauot are read, and an error, if any, is corrected through the error correction circuit ECC. Only corrected data in the data area pADauot is read.

Next, the program in the range (initial program area FIPR) indicated by the initial program area specification data Larea stored in the data area pADauto is transferred to the initial program area D-IPR in DRAMs.

Data transfer from FLASH to DRAMs according to a load command will be described.

To transfer data p24575 in FALSH to DRAMs, a load command, a transfer start address, and transfer data size (one page) are written into the control registers REG through address signals (A0 to A15) and command signals (CKE, /CS, /RAS, /CAS, /WE). Then the control circuit (CTL_LOGIC) on CHIP2 reads data at address 24575 in FLASH, or the origin of transfer, and transfers the data p24575 equivalent to one page (512 Bytes) to Bank 3 (BANK3) of DRAMs according to the memory map established by the memory management circuit MU. When the data is read out of FLASH, data located in the data area p24575 in FLASH and ECC parity data located in the redundant area r24575 are read, and an error, if any, is corrected through the error correction circuit ECC. Only corrected data p24575 is transferred to DRAMs.

Data transfer from DRAMs to FLASH according to a store command will be described.

In order to transfer data from Bank 2 (BANK2) of DRAMs to FALSH, a store command, a transfer start address, and transfer data size (one page) are written into the control registers REG. Then the control circuit (CTL_LOGIC) on CHIP2 reads the data in Bank 2 (BANK2) of DRAMs, and transfers the data equivalent to one page (512 Bytes) to the data area p10240 in FLASH at address 10240, or the destination of transfer, according to the memory map established by the memory management circuit MU.

When data is written into FLASH, the error correction circuit ECC generates ECC parity data. By the flash control signal generation circuit FGEN, the data read out of DRAMs is written into p10240 in FLASH and the generated ECC parity data is written into the redundant area r10240. The address replacement circuit REP checks whether writing successfully completes and, if so, terminates the processing. If writing fails, an address in the replacement area F-REP in FLASH is selected. Then, for example, the data read out of DRAMs is written into replacement data area p0 in the replacement area F-REP in FLASH and the generated ECC parity data is written into the replacement redundant area r0.

Next, the operation of reading data from DRAMs will be described.

When an address in Bank 3 (BANK3) of DRAMs and a read command are inputted through address signals (A0 to A15) and command signals COM (CKE, /CS, /RAS, /CAS, /WE), the address in Bank 3 (BANK3) of DRAMs can be selected to read data. That is, data in FLASH can be read at the same speed as that in DRAM. Data can be similarly read out of the other banks (Bank 2, Bank 1, and Bank 0).

Next, the operation of writing data into DRAMs will be described.

When an address in Bank 2 (BANK2) of DRAMs and a write command are inputted through address signals (A0 to A15) and command signals COM (CKE, /CS, /RAS, /CAS, /WE), the address in Bank 2 (BANK2) of DRAMs can be selected to write data. That is, data in FLASH can be written at the same speed as that in DRAM. Data can be similarly written into the other banks (Bank 2, Bank 1, and Bank 0).

Figure 4:
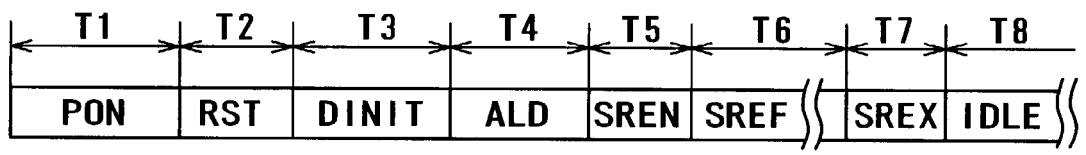

FIG. 4 illustrates the sequence of the initial operation of the control circuit on CHIP2 when power is turned on.

Power is turned on in the period T1 (PON) and reset is performed in the period T2 (RST). The DRAMs are initialized in the period T3 (DINIT) subsequent to the cancellation of reset and the initial program is transferred from FLASH to DRAMs in the period T4 (ALD). During initial program transfer, the refresh control circuit REF performs auto refresh. After the completion of initial program transfer, the refresh control circuit REF brings DRAMs into self refresh state in the period T5 (SREN) for retaining the data transferred to DRAMs. The self refresh state is maintained for the subsequent period T6 (SREF).

If a self refresh cancellation command is inputted through address signals (A0 to A15) and command signals COM (CKE, /CS, /RAS, /CAS, /WE) in the period T7 (SREX) in order to cancel the self refresh state, DRAMs are kept in idle state for the period T8 (IDLE) and subsequent periods and are capable of accepting access.

Figure 5:
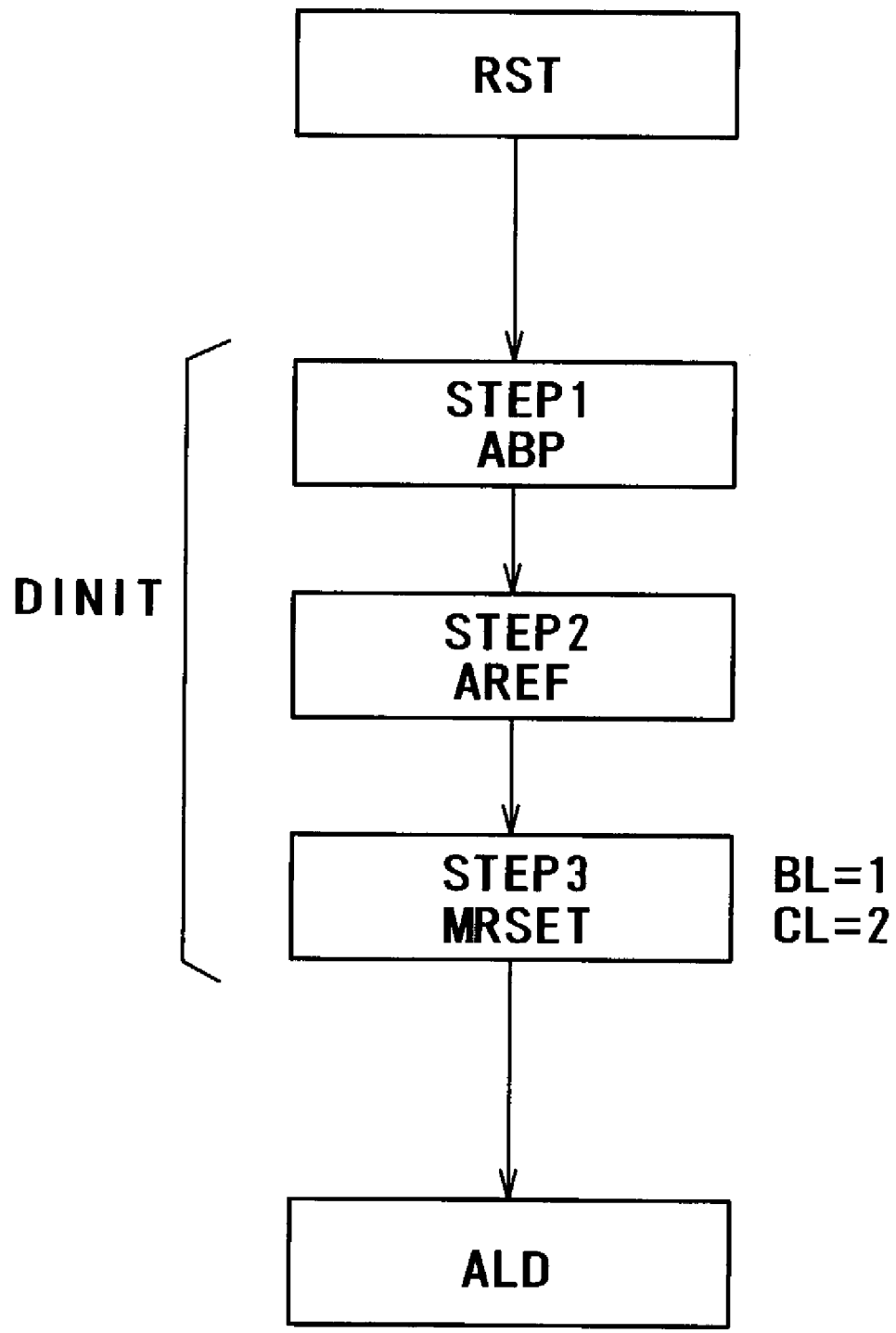

FIG. 5 is a flowchart illustrating an example of initialization effected on general purpose SDRAMs in the period T3 (DINT) illustrated in FIG. 4.

After reset (RST) is performed, initialization (DINIT) is effected on DRAMs. In this initialization of DRAMs, all bank precharge is performed on DRAMs (STEP1: ABP), then auto refresh is performed (STEP2: AREF), and finally, mode register set is performed (STEP3: MRSET). In mode register set (STEP3: MRSET), burst length (BL) is set to 1 and CAS latency (CL) is set to 2.

When the initialization of DRAMs completes, transfer of the initial program from FLASH to DRAMs is started (ALD).

Figure 6:
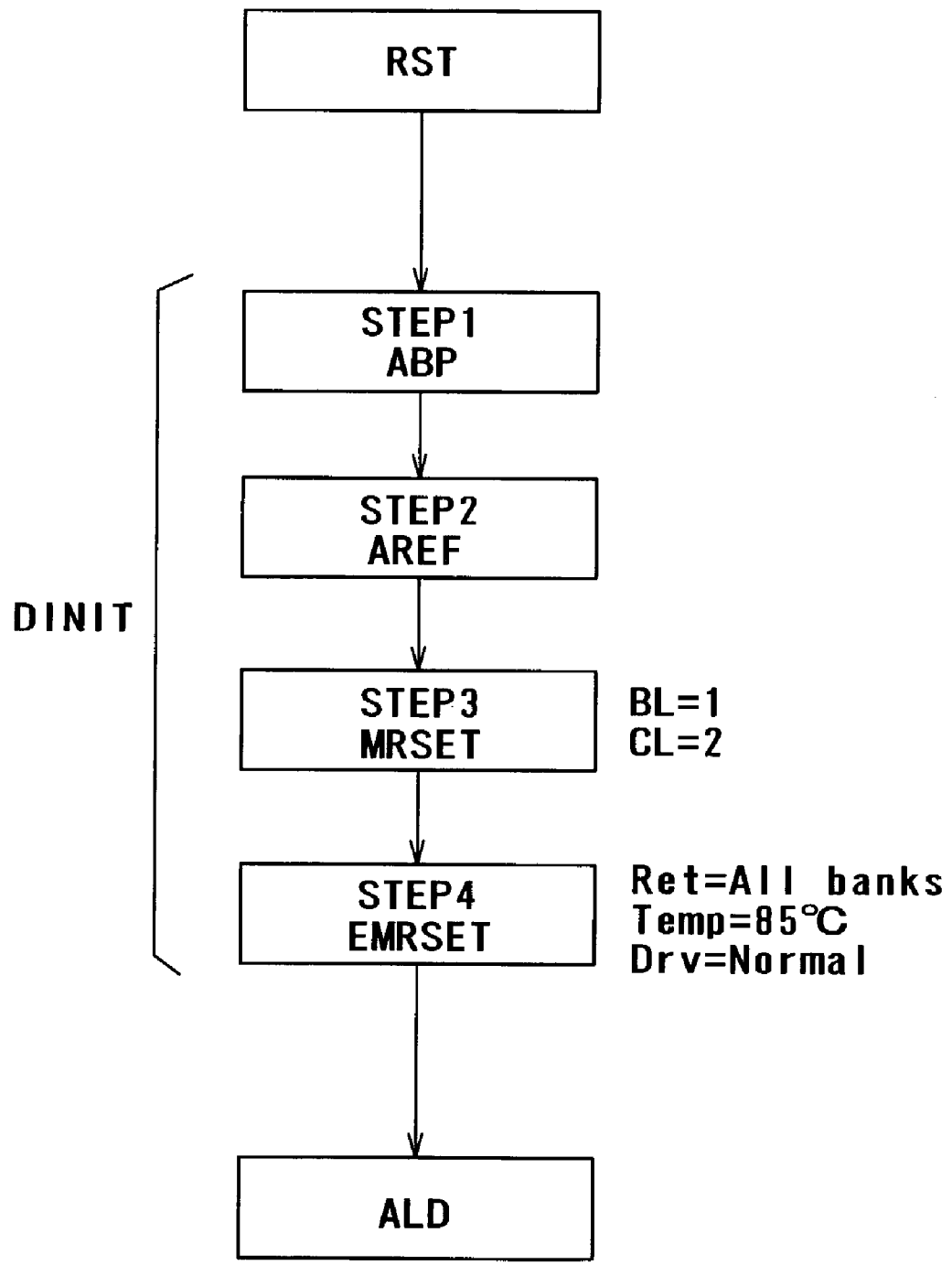

FIG. 6 is a flowchart illustrating an example of initialization effected in the period T3 (DINT) on SDRAMs wherein change of data retention area during self refresh and maximum guaranteed temperature, change of the drive performance of output buffer, and the like are possible as the result of adding extended mode registers EMREG to general purpose SDRAMs conventionally used.

After reset (RST) is performed, initialization (DINIT) is effected on DRAMs. In this initialization of DRAMs, all bank precharge is performed on DRAMs (STEP1: ABP) and then auto refresh is performed (STEP2: AREF). Then mode register set is performed (STEP3: MRSET) and finally, extended mode register set is performed (STEP4: EMRSET). In mode register set (STEP3: MRSET), burst length (BL) is set to 1 and CAS latency (CL) is set to 2. In extended mode register set (STEP4: EMRSET), the data retention area in DRAMs during self refresh is set to all banks (Ret=All banks); maximum guaranteed temperature is set to 85° C. (Temp=85° C.); and the drive performance of output buffer is set to normal (Drv=Normal). When the initialization of DRAMs completes, transfer of the initial program from FLASH to DRAMs is started (ALD).

Figure 7:
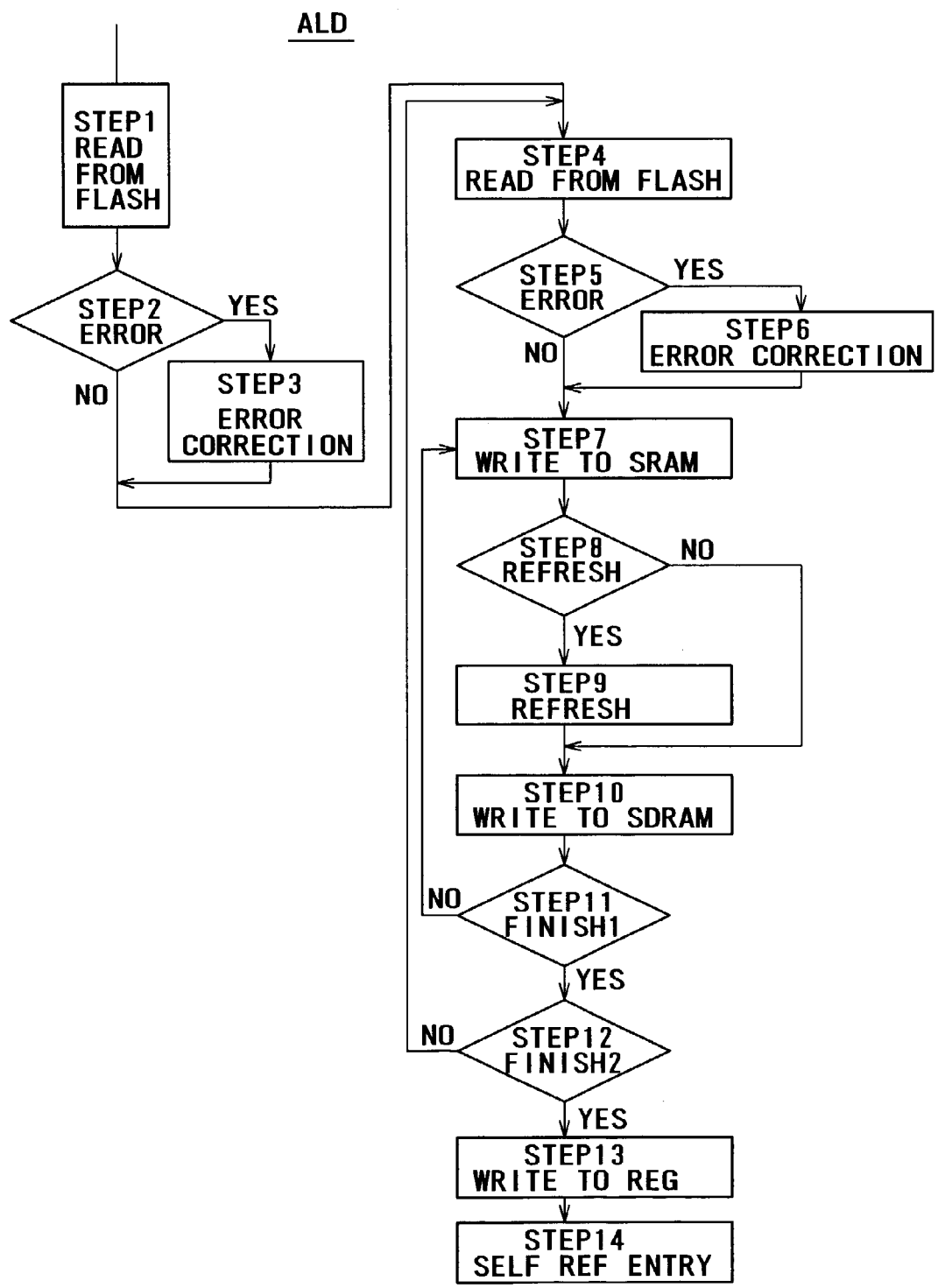

FIG. 7 is a flowchart illustrating an example of the transfer of the initial program from FLASH to DRAMs, made in the period T4 (ALD) after power-on illustrated in FIG. 4. After power is turned on, the control circuit on CHIP2 reads the initial program area specification data Larea out of FLASH (STEP1). Whether the data read has an error is checked (STEP2), and an error, if any, is corrected (STEP3). If there is no error, the data is transferred directly to the access request circuit REQ.

The access request circuit REQ reads the data and ECC parity data from the initial program area F-IPR which is the range indicated by the initial program area specification data Larea (STEP4). Whether the data read has an error is checked (STEP5), and an error, if any, is corrected (STEP6). If there is no error, the data is written directly into the transfer data buffer TDBUF (STEP7).

When the data written into the transfer data buffer TDBUF is written into DRAMs, DRAMs are checked for any generated refresh request (STEP8). If there is a refresh request, refresh is performed (STEP9), and thereafter, the data is written into DRAMs (STEP10). If there is no refresh request, the data is immediately written into DRAMs (STEP10). Whether the data in TDBUF has been all written into DRAMs is checked (STEP11), and, if not, the steps from STEP7 to STEP10 are repeated. If the data has been all written, it is checked whether the data in the initial program area F-IPR in FLASH has been all written into DRAMs (STEP12). If all the data in the initial program area F-IPR in FLASH has not been written, the steps from STEP4 to STEP11 are repeated. If the data in the initial program area F-IPR in FLASH has been all written, a value indicating that the transfer of the initial program has completed is written into the control registers REG (STEP13).

To retain the data in DRAMs, the refresh control circuit REF performs auto refresh during initial program transfer. After the completion of initial program transfer, the refresh control circuit REF issues a self refresh command to DRAMs and brings DRAMs into self refresh state (STEP14).

Figure 8:
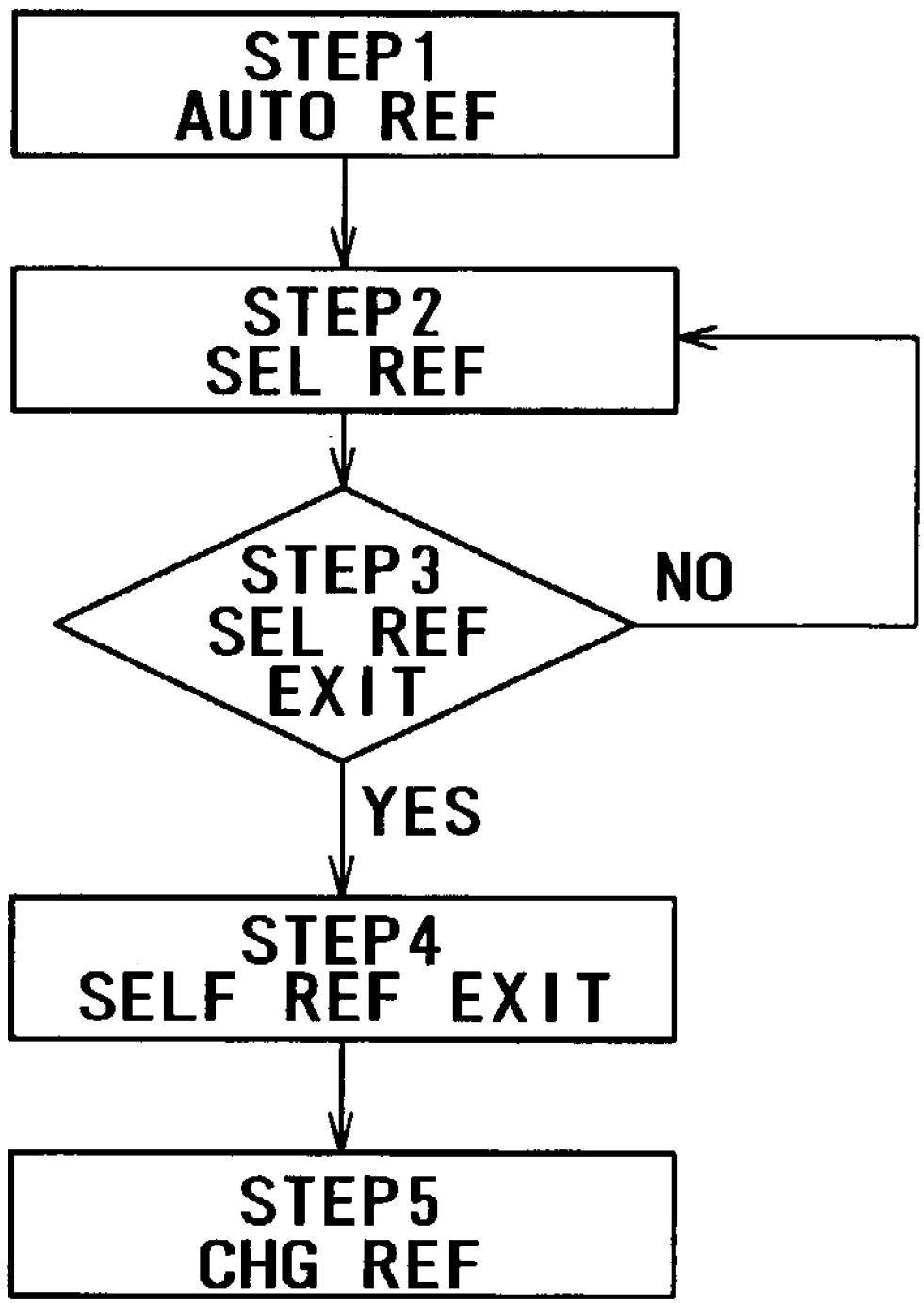
FIG. 8 is a drawing illustrating the refresh operation of the DRAMs in the memory module of the present invention.

FIG. 8 is a flowchart illustrating an example of the switching operation to perform refresh, performed by the refresh control circuit REF in the control circuit on CHIP2, through address signals (A0 to A15) and command signals COM (CKE, /CS, /RAS, /CAS, /WE).

First, during transfer of the initial program, the refresh control circuit REF in the control circuit on CHIP2 performs auto refresh on DRAMs (CHIP3 and CHIP4) (STEP1), and, after the completion of initial program transfer, the refresh control circuit REF issues a self refresh command to DRAMs (CHIP3 and CHIP4) and brings DRAMs into self refresh state (STEP2). When a command to cancel the self refresh state is thereafter inputted through address signals (A0 to A15) and command signals COM (STEP3), DRAMs (CHIP1 and CHIP2) are removed from self refresh state (STEP4). Thereafter, refresh control can be exercised through address signals (A0 to A15) and command signals COM (CKE, /CS, /RAS, /CAS, /WE) (STEP5).

By bringing DRAMs into self refresh state after the completion of initial program transfer, as mentioned above, data can be retained in DRAMs with low power until a command to cancel the self refresh state is inputted through address signals (A0 to A15) and command signals COM, and refresh control can be quickly and accurately switched.

Figure 9:
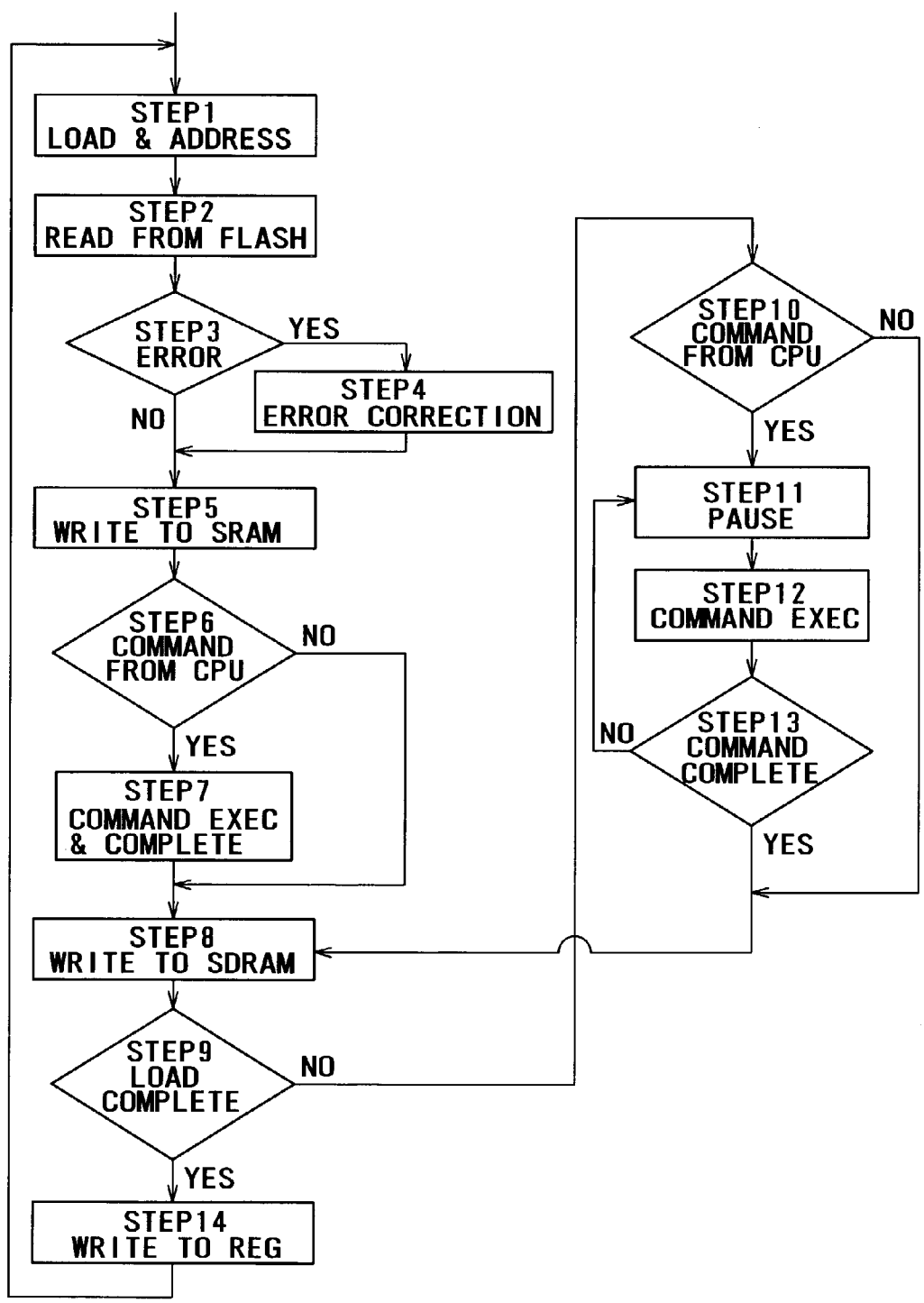
FIG. 9 is a flowchart illustrating the flow of operation of data transfer from FLASH to DRAMs in the memory module of the present invention.

FIG. 9 is a flowchart illustrating data transfer from FLASH to DRAMs, executed according to a load command.

When a load command and an address is inputted to CHIP2 through address signals (A0 to A15) and command signals COM (STEP1), the data and ECC parity data corresponding to the inputted address are read out of FLASH (STEP2). Whether the data read has an error is checked (STEP3). If there is any error, the error is corrected (STEP4), and the corrected data is written into the transfer data buffer TDBUF (STEP5). If there is no error, the data is written directly into the transfer data buffer TDBUF (STEP5).

When the data written into the transfer data buffer TDBUF is written into DRAMs, DRAMs are checked for any command, such as read command, write command, and refresh command, inputted through address signals (A0 to A15) and command signals COM (STEP6). If there is such a command, the command is executed (STEP7) and then writing of data into DRAMs is started (STEP8). If there is no command, writing of data into DRAMs is immediately started (STEP8).

Next, whether the data has been all written from the transfer data buffer TDBUF into DRAMs is checked (STEP9). If all the data has not been written, that is, if writing is in progress yet, DRAMs are checked for any command, such as read command, write command, and refresh command, inputted through address signals (A0 to A15) and command signals COM (CKE, /CS, /RAS, /CAS, /WE) (STEP16). If such a command is generated, the operation of writing from the transfer data buffer TDBUF into DRAMs is caused to pause (STEP11) and the command is executed (STEP12). Whether the command has completed is checked (STEP13) and, if not, STEP11 and STEP12 are repeated. If the command has completed, the operation of writing from the transfer data buffer TDBUF into DRAMs is resumed (STEP8). When the data has been all written from the transfer data buffer TDBUF into DRAMs, a value indicating that the data transfer has completed is written into the control registers REG (STEP14).

Figure 10:
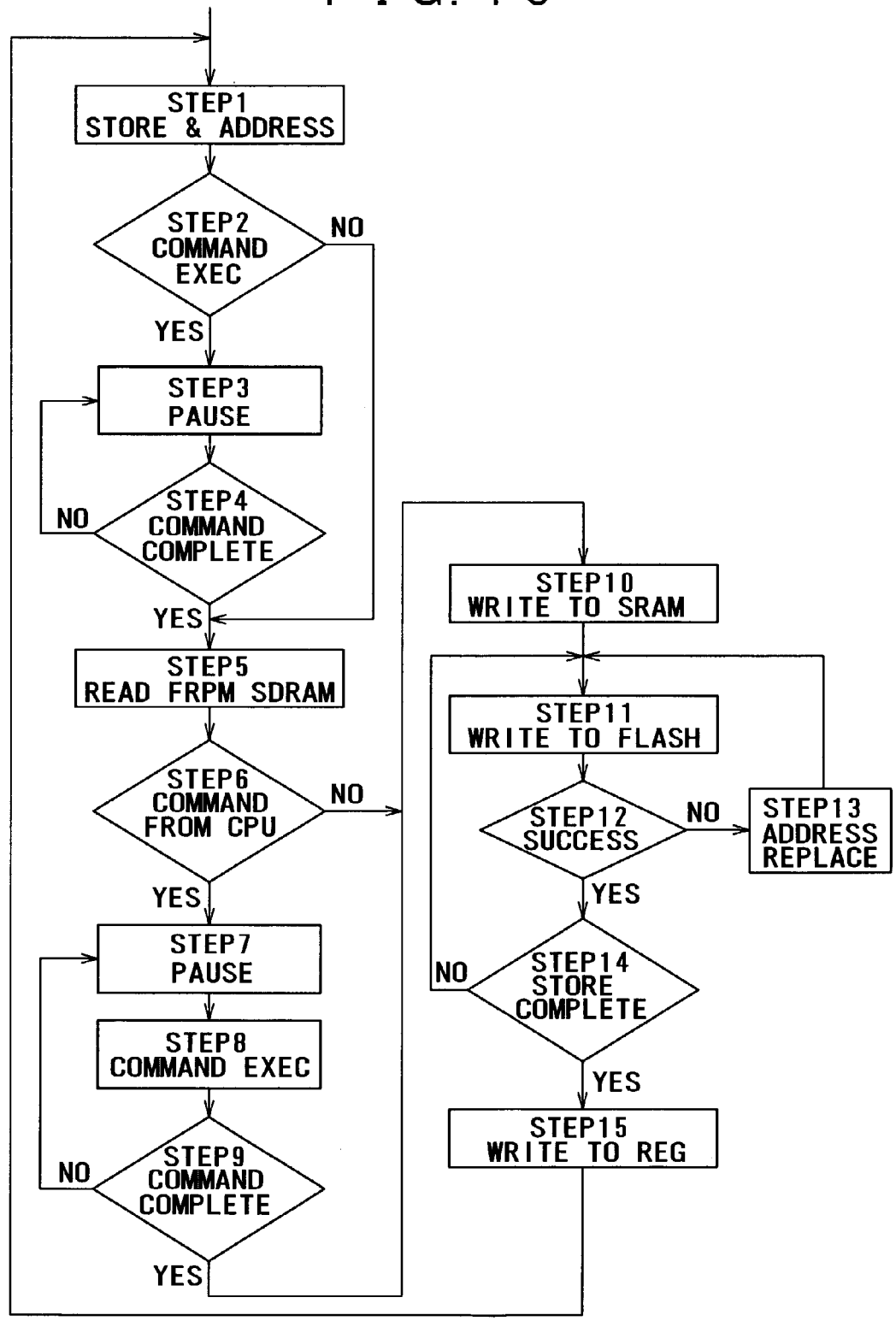
FIG. 10 is a flowchart illustrating the flow of operation of data transfer from DRAMs to FLASH in the memory module of the present invention.

FIG. 10 is a flowchart illustrating data transfer from DRAMs to FLASH, executed according to a store command.

When a store command and an address are inputted to the control circuit on CHIP2 through address signals (A0 to A15) and command signals COM (STEP1), it is checked whether any command, such as read command, write command, and refresh command, is being executed (STEP2). If no command is being executed, reading of data from SDRAMs according to the store command is started (STEP5).

If any command is being executed, execution of the store command is caused to pause (STEP3), and it is checked whether the command presently executed has completed (STEP4). If the command presently executed has not completed, execution of the store command is kept in pause (STEP3). If the command presently executed has completed, reading of data from SDRAMs according to the store command is started (STEP5).

When data is being read out of DRAMs according to the store command, it is checked whether any command, such as read command, write command, and refresh command, is inputted through address signals (A0 to A15) and command signals COM (CKE, /CS, /RAS, /CAS, /WE) (STEP6). If such a command is generated, the operation of reading data from DRAMs is caused to pause (STEP7), and the command is executed (STEP8). Whether the command has completed is checked (STEP9) and, if so, data read out of DRAMs is written into the transfer data buffer TDBUF (STEP10). If the command has not completed, STEP7 and STEP8 are repeated. When the command completes, data read out of DRAMs is written into the transfer data buffer TDBUF (STEP10).

When the data from the transfer data buffer TDBUF is written into FLASH (STEP11), the data which has been read out of DRAMs and transferred to the transfer data buffer TDBUF and ECC parity data generated by the error correction circuit ECC are written into FLASH.

Whether writing into FLASH has successfully completed is checked (STEP12). If the writing fails, another address for substitution is selected (STEP13) and writing into FLASH is performed at the address again (STEP11). If writing has successfully completed, it is checked whether the data has been all transferred according to the store command (STEP11). If the data has not been completely transferred, writing into FLASH is continued (STEP11), and, if the data has been completely transferred, a value indicating that the data transfer has completed is written into the control registers REG (STEP15).

In general, SDRAM consists of four memory banks, Bank 0 to Bank 3, and a minimum time interval Tint-min which is a time period until a bank becomes accessible after the completion of access to another bank is prescribed.

The minimum time interval Tint-cycle [Cycles] at which a command or an address inputted through command signals COM (CKE, /CS, /RAS, /CAS, /WE) or address signals (A0 to A15) is actually issued to DRAMs (CHIP3 and CHIP4) by the control circuit on CHIP2 can be determined based on the above-mentioned minimum time interval Tint-min and clock cycle T.

For accomplishing high-speed operation, an optimum minimum time interval Tint-cycle must be set in correspondence with the minimum time interval Tint-min and the clock cycle T. For example, in case the minimum time interval Tint-min is 20 ns and the clock cycle T is 10 ns, the optimum minimum time interval Tint-cycle is 2 clock cycles. Further, in case the minimum time interval Tint-min is 30 ns and the clock cycle T is 10 ns, the optimum minimum time interval Tint-cycle is 3 clock cycles.

For example, if access to Bank 0 of DRAMs is made from the outside of the memory module through address signals (A0 to A15) and command signals (CKE, /CS, /RAS, /CAS, /WE) while access to Bank 3 of DRAMs is being made in the memory module according to a load command or store command, the control circuit on CHIP2, using the above minimum time interval Tint-cycle, causes the access to DRAMs according to the load command or store command to pause, and thereafter issues an address and a read/write command to DRAMs through address signals (D-A0 to D-A14) and command signals D-COM (D-CKE, D/CS, D-/RAS, D-/CAS, /D-WE) to read or write data in order to process the access through address signals (A0 to A15) and command signals (CKE, /CS, /RAS, /CAS, /WE). After the completion of this access, the control circuit on CHIP2 can resume the access according to the load command or store command.

That is, even when data transfer between FLASH and DRAMs according to a load command or store command is in progress within the memory module, DRAMs are accessible from the outside of the memory module without paying attention to the data transfer by using the minimum time interval Tint-cycle. This makes it possible to cope with needs for the enhancement of the performance of portable devices.

In other words, since data transfer between FLASH and DRAMs according to a load command or store command can be effected in the background, it is possible to transfer required data to DRAMs or FLASH before due time without paying attention to access from the outside of the memory module. This also makes it possible to cope with needs for the enhancement of the performance of portable devices.

Figure 11:
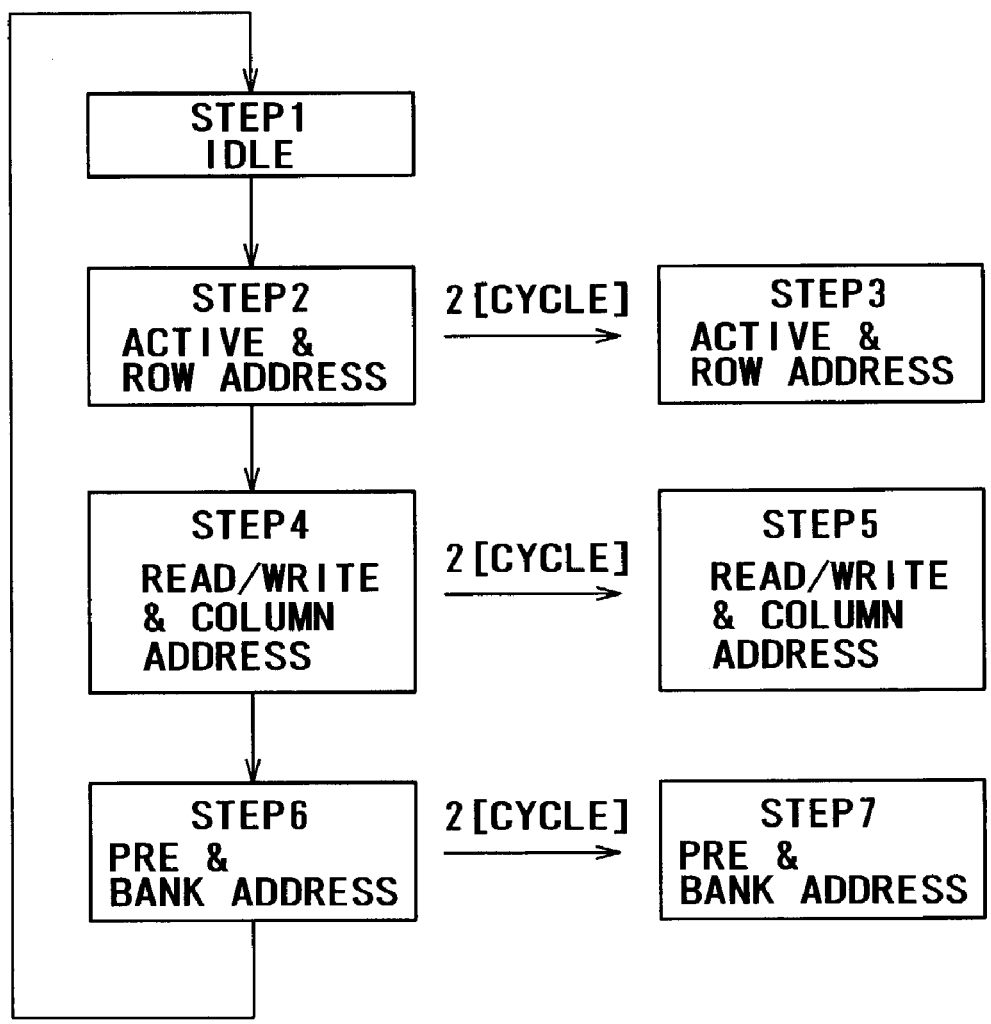
FIG. 11 is a drawing illustrating an example of the operation of reading and writing from and to the memory module of the present invention.

FIG. 11 illustrates an example of the operation of reading and writing data with the minimum time interval Tint set to 2 clock cycles.

The DRAMs are in idle state (STEP1). When a bank active command and a row address are inputted through the SDRAM interface through command signals COM and address signals (A0 to A15) (STEP2), the control circuit on CHIP2, 2 clock cycles later, issues the bank active command and the row address to DRAMs (CHIP3 and CHIP4) through command signals D-COM and address signals (D-A0 to D-A14) (STEP3).

When a read command (READ) or write command (WRITE) and a column address are thereafter inputted (STEP4), the control circuit on CHIP2, 2 clock cycles later, issues the read or write command and the row address to DRAMs (CHIP3 and CHIP4) through command signals D-COM and address signals (D-A0 to D-A14) (STEP5).

When a precharge command and a bank address are finally inputted (STEP6), the control circuit on CHIP2, 2 clock cycles later, issues the precharge command and the bank address to DRAMs (CHIP3 and CHIP4) through command signals D-COM and address signals (D-A0 to D-A14) (STEP7).

FIG. 12A illustrates an example of the procedure for changing the minimum time interval Tint-cycle at which a command or an address inputted through command signals COM (CKE, /CS, /RAS, /CAS, /WE) or address signals (A0 to A15) is actually issued to DRAMs (CHIP3 and CHIP4).

FIG. 12A will be described. The DRAMs are in idle state (STEP1). When a cycle time change command and an address are inputted through command signals COM and address signals (A0 to A15) (STEP2), the control registers REG are selected according to the address and the cycle time change command is written into the control registers. Thereafter, according to the cycle time change command, the timing with which a command or an address inputted through command signals COM or address signals (A0 to A15) is actually issued to DRAMs (CHIP3 and CHIP4) is changed (STEP3).

FIG. 12B illustrates an example of reading and writing of data with the minimum time interval Tint-cycle, with which a command or an address inputted through command signals COM or address signals (A0 to A15) is actually issued to DRAMs (CHIP3 and CHIP4), to 3 clock cycles. In FIG. 12B, the word "EXTERNAL" indicates that input is done from the outside of the module, that is, through the input/output terminals of the control circuit on CHIP2. The same applies to the following timing charts.

First, a bank active command A is inputted through command signals COM and an address R4 is inputted through address signals A0 to A15. Next, a write command W is inputted through command signals COM; an address C0 is inputted through address signals A0 to A15; and a cycle time change command Cy and a set cycle time cy0 are inputted through input/output signals IO0 to IO15. The control registers REG are selected through address signals A0 to A15, and the cycle time change command CY and the set cycle time cy0 are written into the registers REG.

Thereafter, according to the cycle time change command CY, CHIP2 changes the timing with which a command or an address inputted through command signals COM or address signals (A0 to A15) is actually issued to DRAMs (CHIP3 and CHIP4).

Thereafter, commands and addresses are issued to DRAMs with the set timing. When the minimum time interval Tint related to bank active command, row address, read command, column address, precharge command, and bank address is changed to 3 clock cycles by the cycle time change command CY, the bank active command A and address R3, the read command R and address C0, and the precharge command P and address R3 inputted through command signals COM and address signals A0 to A15 are, 3 clock cycles later, issued to DRAMs through command signals D-COM and address signals D-A0 to D-A15 to read data out of Bank 3 (BANK3) of DRAMs.

Figure 13:
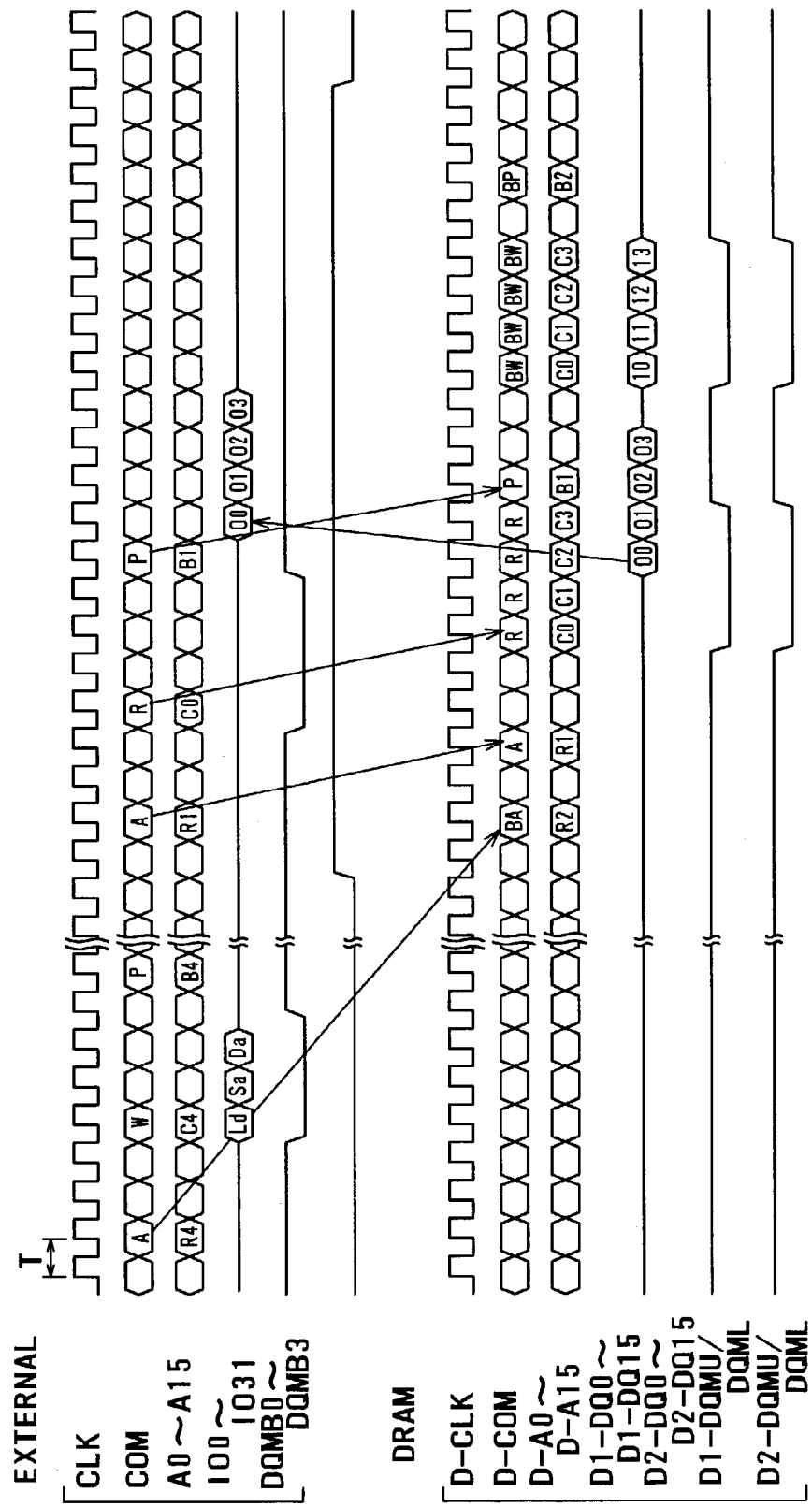
FIG. 13 is a timing diagram illustrating an example of memory system operations when the DRAMs are instructed to perform a read operation while the DRAMs are already in the process of performing a write operation, according to a load command.

FIG. 13 illustrates the operation performed when data read access to Bank 1 of DRAMs is made through address signals A0 to A15 and command signals COM while data transfer to Bank 2 of DRAMs according to a load command is in progress. In this case, the minimum time interval Tint-cycle is set to 2 clock cycles.

First, a bank active command A is inputted through command signals COM and an address R4 is inputted through address signals A0 to A15. Next, a write command W is inputted through command signals COM; an address C4 is inputted through address signals A0 to A15; and a load command Ld, a transfer start address Sa, and transfer data size Da are inputted through input/output signals IO0 to IO31. The control registers REG are selected through address signals A0 to A15 and the load command Ld, the transfer start address Sa, and the transfer data size Da are written into the registers REG.

Thereafter, according to the load command, data is read out of FLASH and written into Bank 2 of DRAMs. In writing data into DRAMs according to a load command, a bank active command BA and an address R2 are issued to DRAMs and the command generator CGEN from the address generator AGEN, respectively. When a bank active command A is inputted through command signals COM and an address R1 is inputted through address signals A0 to A15 to read data out of Bank 1 of DRAMs at this time, the command generator CGEN and the address generator AGEN issue the bank active command A and the address R1 to DRAMs with a delay of 2 clock cycles. In this period of 2 clock cycles, the command generator CGEN and the address generator AGEN temporarily stop the issuance of commands for writing data into DRAMs according to the load command.

Next, when a read command R is inputted through command signals COM and an address C0 is inputted through address signals A0 to A15, the command generator CGEN and the address generator AGEN issue the read command R and the address C0 to DRAMs with a delay of 2 clock cycles.

In case the burst length is 4, the address C0 is incremented by +1 by the counter CT and addresses C1, C2, and C3 and the read command R are continuously issued to DRAMs from the address generator AGEN and the command generator CGEN, respectively. Thus, data corresponding to the addresses C0, C1, C2, and C3 is read through input/output signals D1-DQ0 to DQ15, D2-DQ0 to DQ15. The data is finally read through IO0 to IO31.

Next, when a precharge command P is inputted through command signals COM and an address B1 is inputted through address signals A0 to A15, Bank 1 of DRAMs is brought into idle state.

When the reading of data from Bank 1 of DRAMs completes, the command generator CGEN and the address generator AGEN issue to DRAMs a write command BW and addresses C0, C1, C2, and C3 for writing data into DRAMs according to the load command, and write data (I0, I1, I2, I3) outputted from the IO data control circuit IOCON into DRAMs.

When this writing completes, the command generator CGEN and the address generator AGEN issue a precharge command P and an address B2 to DRAMs and bring Bank 2 of DRAMs into idle state.

A data transfer signal TE is kept High for the period for which data transfer to DRAMs according to the load command is in progress, and kept Low when data transfer is not performed.

As mentioned above, even when writing into DRAMs according to a load command is in progress, read access can be accepted any time through address signals A0 to A15 and command signals COM, and data can be outputted in the same time as in DRAMs. The same operation is performed if data write access to Bank 1 of DRAMs is made through address signals A0 to A15 and command signals COM when data transfer to Bank 2 of DRAMs according to a load command is in progress. Even when writing into DRAMs according to a load command is in progress, write access through address signals A0 to A15 and command signals COM can be accepted, and data can be written into DRAMs in the same time as in DRAMs.

Figure 14:
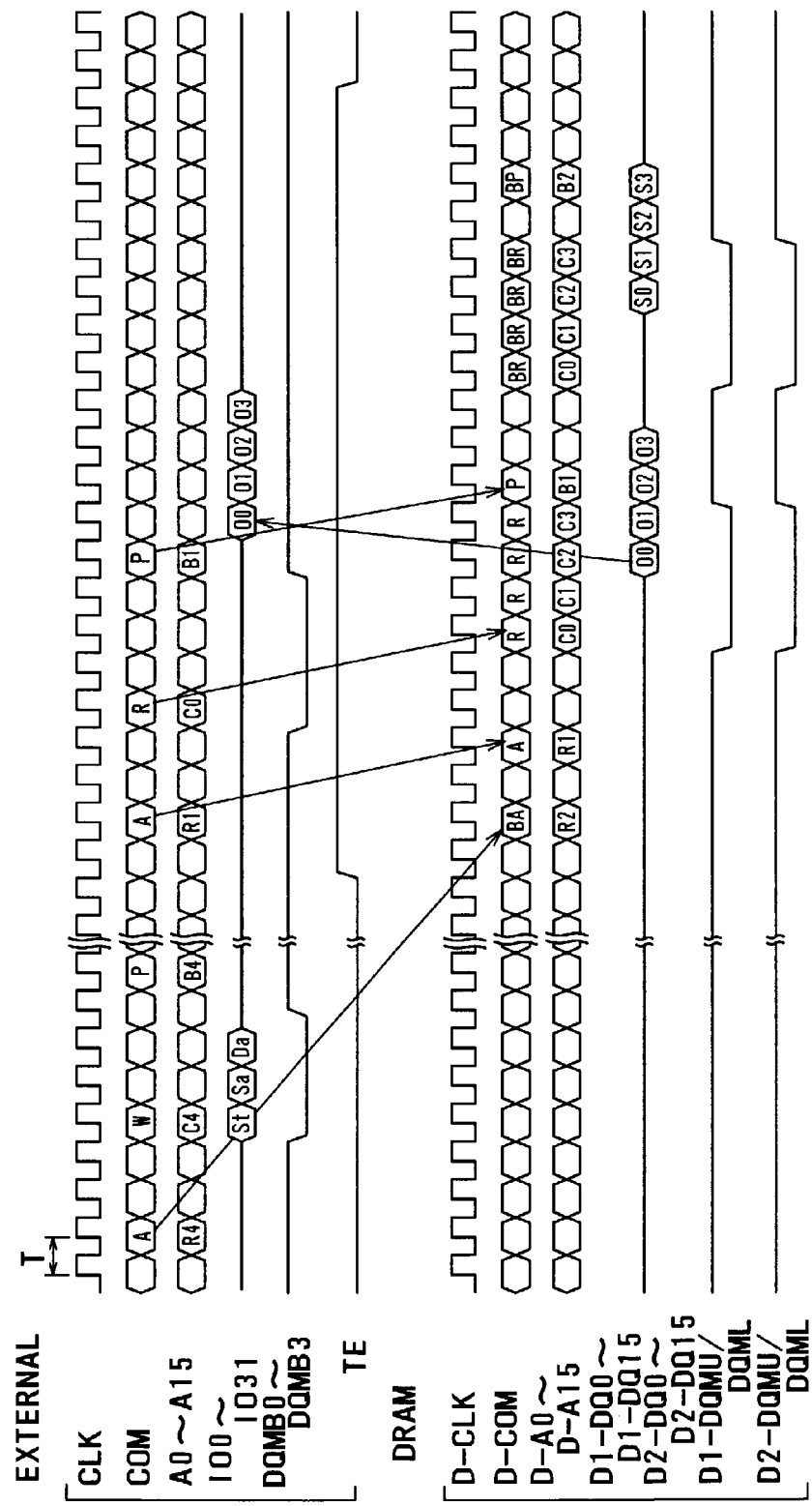
FIG. 14 is a timing diagram illustrating an example of memory system operations when the DRAMs are instructed to perform a read operation while the DRAMs are already in the process of performing a read operation, according to a store command.

FIG. 14 illustrates the operation performed when data read access to Bank 1 of DRAMs is made through address signals A0 to A15 and command signals COM while data transfer from Bank 2 (BANK2) of DRAMs according to a store command is in progress. In this case, the minimum time interval Tint-cycle is set to 2 clock cycles.

First, a bank active command A is inputted through command signals COM and an address R4 is inputted through address signals A0 to A15.

Next, a write command W is inputted through command signals COM; an address C4 is inputted through address signals A0 to A15; and a store command St, a transfer start address Sa, transfer data size Da are inputted through input/output signals IO0 to IO31. The control registers REG are selected through address signals A0 to A15 and the store command St, the transfer start address Sa, and the transfer data size Da are written into the registers REG.

Thereafter, according to the store command, data is read out of Bank 2 of DRAMs and written into FLASH. In reading data from DRAMs according to a store command, a bank active command BA and an address R2 are first issued to DRAMs from the command generator CGEN and the address generator AGEN, respectively. When a bank active command A is inputted through command signals COM and an address R1 is inputted through address signals A0 to A15 to read data out of Bank 1 of DRAMs, the command generator CGEN and the address generator AGEN issue the bank active command A and the address R1 to DRAMs with a delay of 2 clock cycles. In this period of 2 clock cycles, the command generator CGEN and the address generator AGEN temporarily stop the issuance of commands for reading data from DRAMs according to the store command.

Next, when a read command R is inputted through command signals COM and an address C0 is inputted through address signals A0 to A15, the command generator CGEN and the address generator AGEN issue the read command R and the address C0 to DRAMs with a delay of 2 clock cycles.

In case the burst length is 4, the address C0 is incremented by +1 by the counter CT and addresses C1, C2, and C3 and the read command R are continuously issued to DRAMs from the address generator AGEN and the command generator CGEN, respectively: Thus, data (O0, O1, O2, O3) corresponding to the addresses C0, C1, C2, and C3 is read through input/output signals D1-DQ0 to DQ15, D2-DQ0 to DQ15. The data is finally outputted through input/output signals IO0 to IO31.

Next, when a precharge command P is inputted through command signals COM and an address B1 is inputted through address signals A0 to A15, Bank 1 of DRAMs is brought into idle state.

When the reading of data from Bank 1 of DRAMs completes, the command generator CGEN and the address generator AGEN issue to DRAMs a read command BR and addresses C0, C1, C2, and C3 for reading data from DRAMs according to the store command. Thus, data (S0, S1, S2, S3) corresponding to the addresses C0, C1, C2, and C3 is read through input/output signals D1-DQ0 to DQ15, D2-DQ0 to DQ15. When this reading of data completes, the command generator CGEN and the address generator AGEN issue the precharge command P and an address B2 to DRAMs and bring Bank 2 of DRAMs into idle state. A data transfer signal TE is kept High for the period for which data transfer from DRAMs according to the store command is in progress, and kept Low when data transfer is not performed.

As mentioned above, even when reading of data from Bank 2 of DRAMs according to a store command is in progress, read access can be accepted any time through address signals A0 to A15 and command signals COM, and data can be outputted in the same time as in DRAMs.

The same operation is performed if data write access to Bank 1 of DRAMs is made through address signals A0 to A15 and command signals COM when reading of data from Bank 2 of DRAMs according to a store command is in progress. Even when reading of data from DRAMs according to a store command is in progress, write access through address signals A0 to A15 and command signals COM can be accepted, and data can be written into DRAMs in the same time as in DRAMs.

Figure 15:
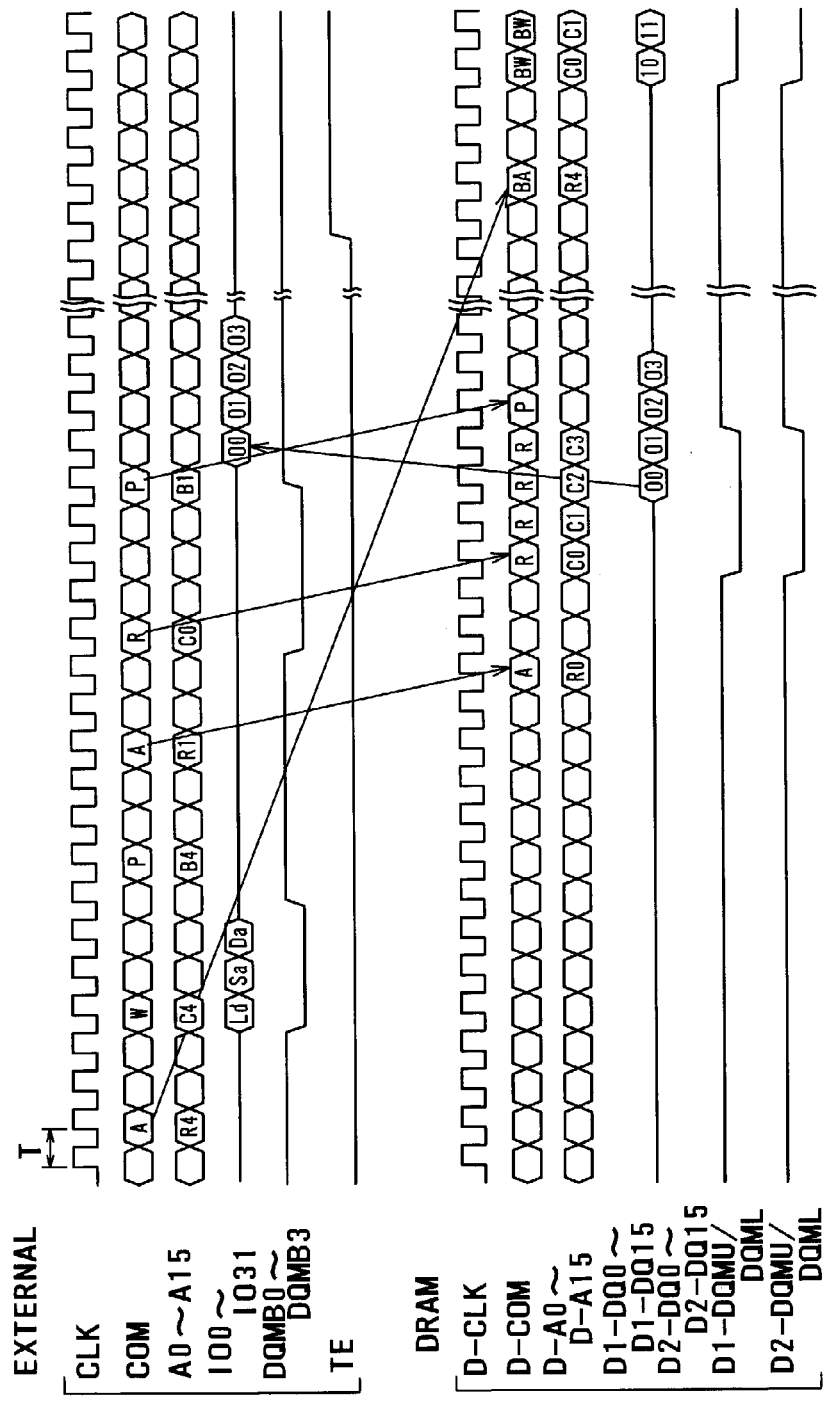
FIG. 15 is a timing diagram illustrating an example of memory system operations when the DRAMs are instructed to perform a read operation before the DRAMs are in the process of performing a write operation, according to a load command.

FIG. 15 illustrates the operation performed when data read access to Bank 1 of DRAMs is made through address signals A0 to A15 and command signals COM before data transfer to Bank 2 of DRAMs according to a load command takes place. In this case, the minimum time interval Tint-cycle is set to 2 clock cycles.

First, a bank active command A is inputted through command signals COM and an address R4 is inputted through address signals A0 to A15.

Next, a write command W is inputted through command signals COM; an address C4 is inputted through address signals A0 to A15; and a load command Ld, a transfer start address Sa, and transfer data size Da are inputted through input/output signals IO0 to IO31. The control registers REG are selected through address signals A0 to A15 and the load command Ld, the transfer start address Sa, and the transfer data size Da are written into the registers REG.

Thereafter, according to the load command, data is read out of FLASH and written into Bank 2 of DRAMs. If access to read data from Bank 1 of DRAMs is made through command signals COM before writing into Bank 2 of DRAMs according to the load command is actually performed, the operation of writing into Bank 2 of DRAMs according to the load command is performed after the completion of reading of data from Bank 1 of DRAMs.

When a bank active command A is inputted through command signals COM and an address R1 is inputted through address signals A0 to A15 in order to read data from Bank 1 of DRAMs, the command generator CGEN and the address generator AGEN issue the bank active command A and the address R1 to DRAMs with a delay of 2 clock cycles.

Next, when a read command R is inputted through command signals COM and an address C0 is inputted through address signals A0 to A15, the command generator CGEN and the address generator AGEN issue the read command R and the address C0 to DRAMs with a delay of 2 clock cycles.

In case the burst length is 4, the address C0 is incremented by +1 by the counter CT and addresses C1, C2, and C3 and the read command R are continuously issued to DRAMs from the address generator AGEN and the command generator CGEN, respectively. Thus, data corresponding to the addresses C0, C1, C2, and C3 is read through input/output signals D1-DQ0 to DQ15, D2-DQ0 to DQ15. The data is finally read through input/output signals IO0 to IO31.

Next, when a precharge command P is inputted through command signals COM and an address B1 is inputted through address signals A0 to A15, Bank 1 of DRAMs is brought into idle state.

When the reading of data from Bank 1 of DRAMs completes, the command generator CGEN and the address generator AGEN issue to DRAMs a bank active command BA and an address R2 for writing data into DRAMs according to the load command.

Next, a write command BW and addresses C0, C1, C2, and C3 are issued to DRAMs, and data (I0, I1, I2, I3) outputted from the IO data control circuit IOCON is written into Bank 2 of DRAMs.

When this writing completes, the command generator CGEN and the address generator AGEN issue a precharge command P and an address B2 to DRAMs, and Bank 2 of DRAMs is brought into idle state.

Figure 16:
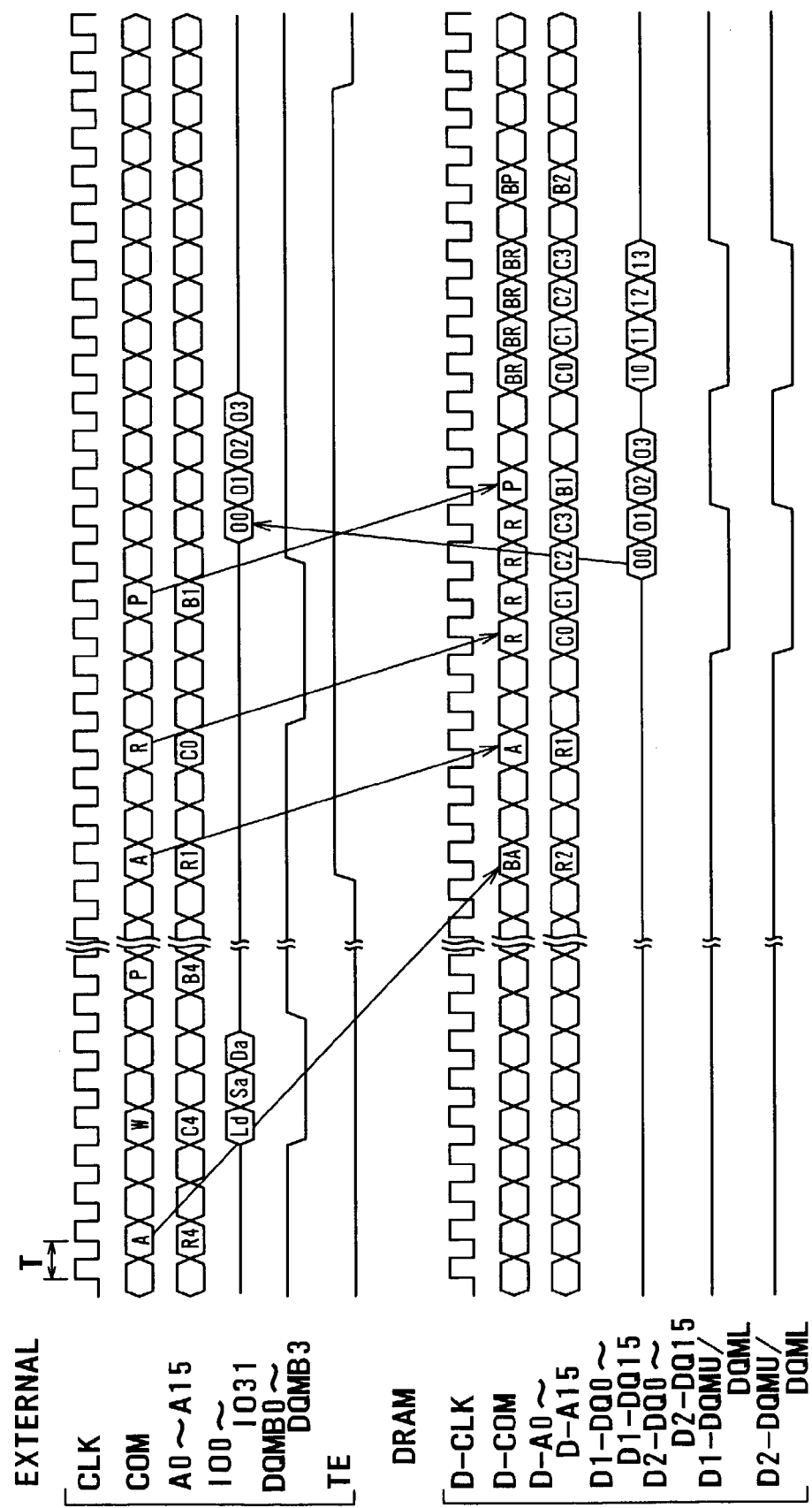
FIG. 16 is a timing diagram illustrating an example of memory system operations when the DRAMs are instructed to perform a read operation while the DRAMs are already in the process of performing a write operation, according to a load command.

FIG. 16 illustrates the operation performed when data read access to Bank 1 of DRAMs is made through address signals A0 to A15 and command signals COM while data transfer to Bank 2 of DRAMs according to a load command is in progress. In this case, the minimum time interval Tint-cycle is set to 3 clock cycles.

First, a bank active command A is inputted through command signals COM and an address R4 is inputted through address signals A0 to A15.

Next, a write command W is inputted through command signals COM; an address C4 is inputted through address signals A0 to A15; and a load command Ld, a transfer start address Sa, and transfer data size Da are inputted through input/output signals IO0 to IO31. The control registers REG are selected through address signals A0 to A15 and the load command Ld, the transfer start address Sa, and the transfer data size Da are written into the registers REG.

Thereafter, according to the load command, data is read out of FLASH and written into Bank 2 of DRAMs. In writing data into Bank 2 of DRAMs according to a load command, a bank active command BA and an address R2 are first issued to DRAMs from the command generator CGEN and the address generator AGEN, respectively. When a bank active command A is inputted through command signals COM and an address R1 is inputted through address signals A0 to A15 to read data out of Bank 1 of DRAMs, the command generator CGEN and the address generator AGEN issue the bank active command A and the address R1 to DRAMs with a delay of 3 clock cycles. In this period of 3 clock cycles, the command generator CGEN and the address generator AGEN temporarily stop the issuance of commands for writing data into DRAMs according to the load command.

Next, when a read command R is inputted through command signals COM and an address C0 is inputted through address signals A0 to A15, the command generator CGEN and the address generator AGEN issue the read command R and the address C0 to DRAMs with a delay of 3 clock cycles.

In case the burst length is 4, the address C0 is incremented by +1 by the counter CT and addresses C1, C2, and C3 and the read command R are continuously issued to DRAMs from the address generator AGEN and the command generator CGEN, respectively. Thus, data corresponding to the addresses C0, C1, C2, and C3 is read through input/output signals D1-DQ0 to DQ15, D2-DQ0 to DQ15. The data is finally read through input/output signals IO0 to IO31.

Next, when a precharge command P is inputted through command signals COM and an address B1 is inputted through address signals A0 to A15, Bank 1 of DRAMs is brought into idle state.

When the reading of data from Bank 1 of DRAMs completes, the command generator CGEN and the address generator AGEN issue to DRAMs a write command BW and addresses C0, C1, C2, and C3 for writing data into DRAMs according to the load command, and data (I0, I1, I2, I3) outputted from the IO data control circuit IOCON is written into DRAMs.

When this writing completes, the command generator CGEN and the address generator AGEN issue a precharge command P and an address B2 to DRAMs, and Bank 2 of DRAMs is brought into idle state. A data transfer signal TE is kept high for the period for which data transfer to DRAMs according to the load command is in progress, and kept low when data transfer is not performed.

As mentioned above, even when writing into DRAMs according to a load command is in progress, read access can be accepted any time through address signals A0 to A15 and command signals COM, and data can be outputted in the same time as in DRAMs. The same operation is performed if data write access to Bank 1 of DRAMs is made through address signals A0 to A15 and command signals COM when data transfer to Bank 2 of DRAMs according to a load command is in progress. Even when writing into DRAMs according to a load command is in progress, write access through address signals A0 to A15 and command signals COM can be accepted, and data can be written into DRAMs in the same time as in DRAMs.

Figure 17:
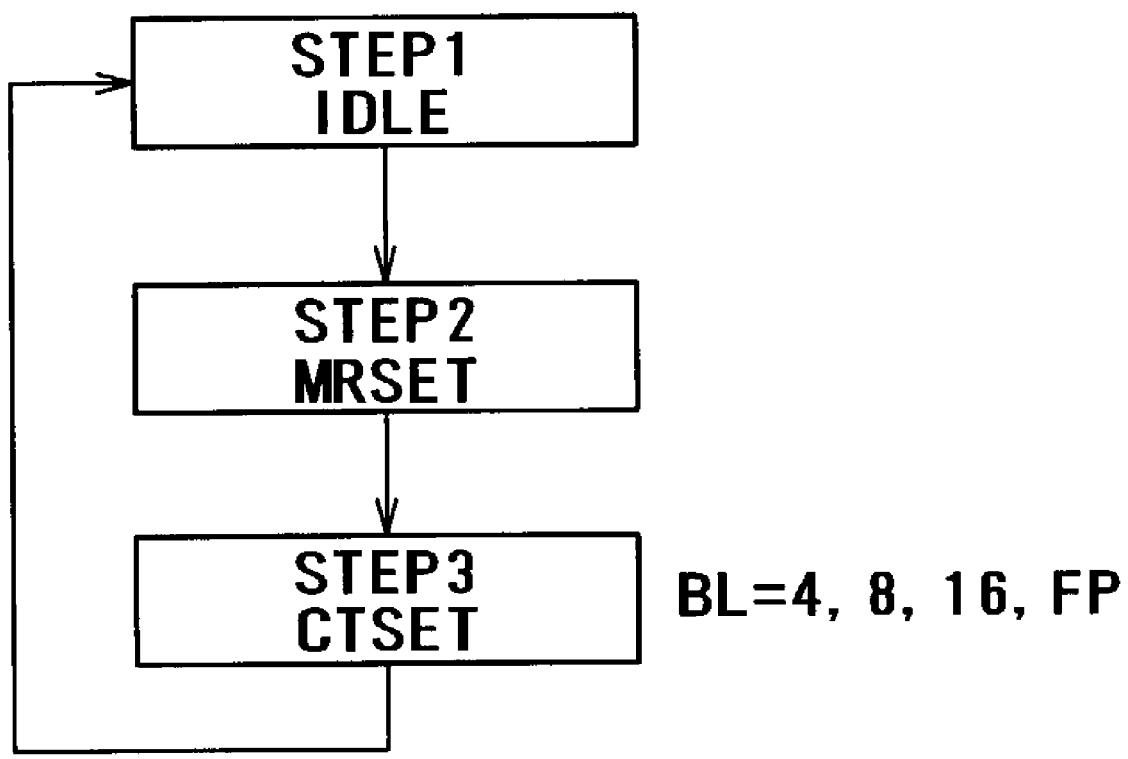
FIG. 17 is a drawing illustrating an example of the operation of changing a burst length according to a mode register set command in the memory module of the present invention.

FIG. 17 illustrates the operation of changing the burst length of the memory module according to a mode register set command MRS through command signals COM and address signals A0 to A15.

The memory module is in idle state (STEP1). When a mode register set command (MRSET) is inputted through command signals COM and a value of burst length BL is inputted through address signals A0 to A15 (STEP2), the value of burst length BL is set on the counter circuit CT. A value from 1 to 256 can be set for burst length BL.

Figure 18:
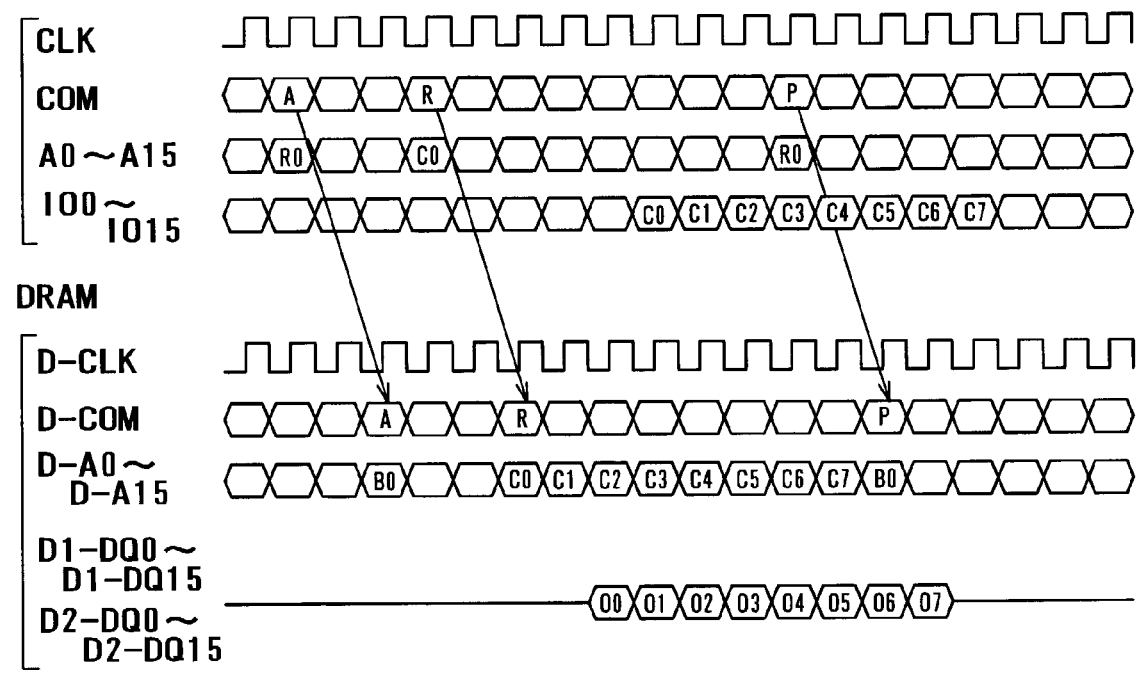
FIG. 18 is a drawing illustrating an example of the operation of reading data from the memory module of the present invention.

FIG. 18 is a timing chart illustrating the operation of reading performed from the outside of the memory module with the burst length BL of the memory module set to 8 by a mode register set command MRS.

When a bank active command A is inputted through command signals COM and an address R0 is inputted through address signals A0 to A15 in order to read data out of Bank 0 of DRAMs, the command generator CGEN and the address generator AGEN issue the bank active command A and the address R0 to DRAMs with a delay of 2 clock cycles.

Next, when a read command R is inputted through command signals COM and an address C0 is inputted through address signals A0 to A15, the command generator CGEN and the address generator AGEN issue the read command R and the address C0 to DRAMs with a delay of 2 clock cycles.

Since the burst length is set to 8, the address C0 is incremented by +1 by the counter CT and addresses C1, C2, C3, C4, C5, C6, and C7 and the read command R are continuously issued to DRAMs from the address generator AGEN and the command generator CGEN, respectively. Thus, data corresponding to the addresses C0 to C7 is read through input/output signals D1-DQ0 to DQ15, D2-DQ0 to DQ15 and outputted through input/output signals IO0 to IO31. Finally, a precharge command P is inputted through command signals COM and an address B0 is inputted through address signals A0 to A15, and Bank 0 of DRAMs is brought into idle state.

Since the memory module is operable with any burst length from 1 to 256, as mentioned above, a burst length suitable for the specifications for a system which uses the present memory module is selectable.

Figure 19A:
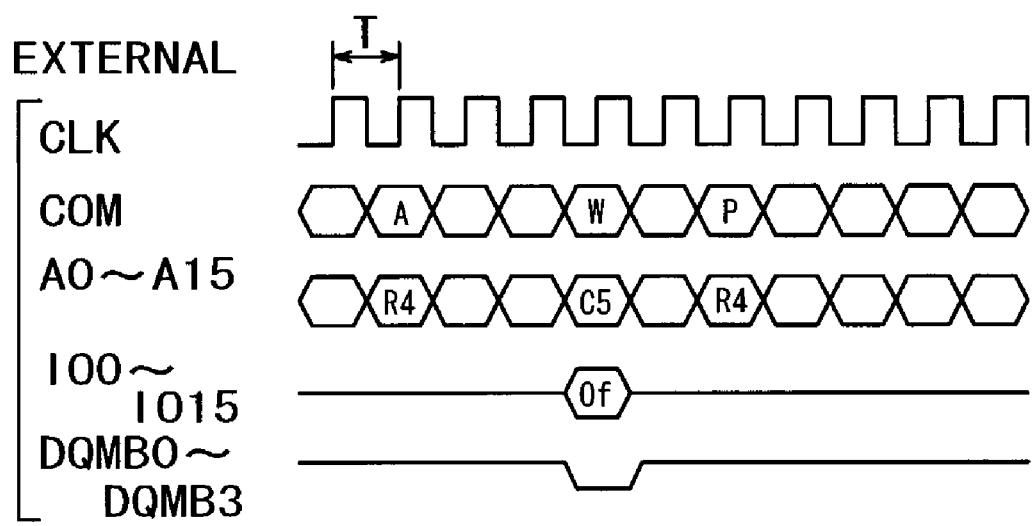
FIG. 19A is a drawing illustrating an example of a command to interrupt power supply to DRAMs in the memory module of the present invention.

FIG. 19A is a timing chart illustrating a method for inputting a power supply interrupt command for SDRAMs from the outside of the memory module.

First, a bank active command A is inputted through command signals COM and an address R4 is inputted through address signals A0 to A15. Next, a write command W is inputted through command signals COM; an address C5 is inputted through address signals A0 to A15; and a power supply interrupt command Of is inputted through input/output signals IO31 to IO0. The control registers REG are selected through address signals A0 to A15 and the power supply interrupt command Of is written into the registers REG. Thereafter, according to the power supply interrupt command, the power control circuit PCON interrupts power supply D-VCC and D-VSSQ to SDRAMs.

Figure 19B:
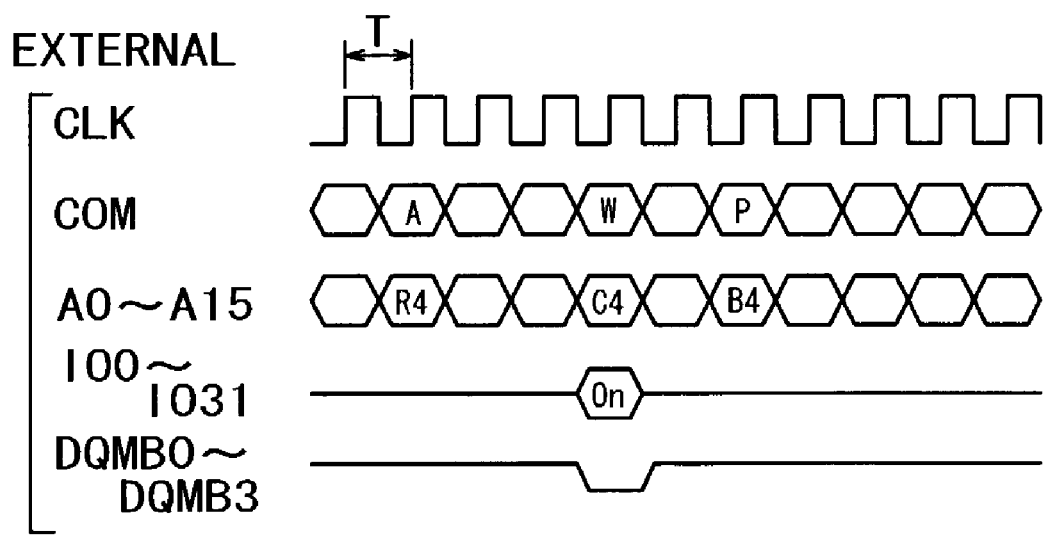
FIG. 19B is a drawing illustrating an example of a command to turn on power to DRAMs in the memory module of the present invention.

FIG. 19B is a timing chart illustrating a method for inputting a power-on command to turn on power to SDRAMs from the outside of the memory module.

A bank active command A is inputted through command signals COM and an address R4 is inputted through address signals A0 to A15. Next, a write command W is inputted through command signals COM; an address C5 is inputted through address signals A0 to A15; and a power-on command On is inputted through input/output signals IO0 to IO31. Thereafter, the control registers REG are selected through address signals A0 to A15 and the power-on command On is written into the registers REG. Thereafter, according to the power-on command, the power control circuit PCON starts power supply D-VCC and D-VSSQ to SDRAMs. Thereafter, the initialization illustrated in FIG. 4 is performed.

Since the power supply can be controlled with the compatibility of SDRAM interfaces maintained, as mentioned above, the power supply to DRAMs may be interrupted when data need not be retained in DRAMs and thus the power consumption of the memory module can be reduced. Further, power can be supplied to DRAMs by the power-on command for DRAMs and thus DRAMs can be quickly used again.

Figure 20:
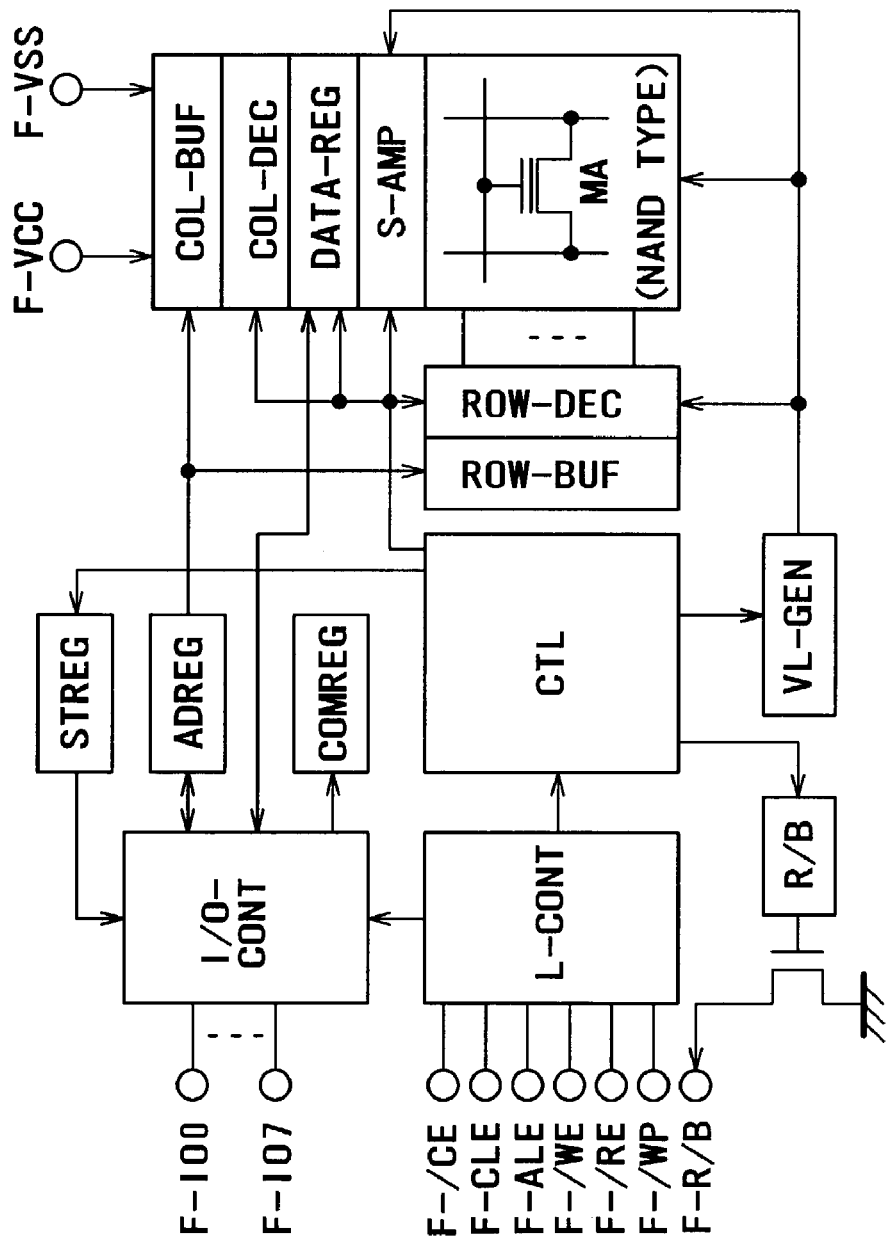
FIG. 20 is a block diagram illustrating an example of the constitution of FLASH illustrated in FIG. 1.

FIG. 20 is a block diagram illustrating an example of a NAND-type flash memory for use in CHIP1 (FLASH) illustrated in FIG. 1, comprising the memory module.

The CHIP1 consists of an operation logic controller LCONT, a control circuit CTL, an input/output control circuit I/O-CONT, a status register STREG, an address register ADREG, a control register COMREG, a ready/busy circuit R/B, a high voltage generation circuit VL-GEN, a row address buffer ROWBUF, a row address decoder ROW-DEC, a column buffer COL-BUF, a column decoder COL-DEC, data registers DATA-REG, a sense amplifier S-AMP, and a memory array MA.

The CHIP1 operates in the same manner as NAND-type flash memories conventionally in wide use.

Figure 21:
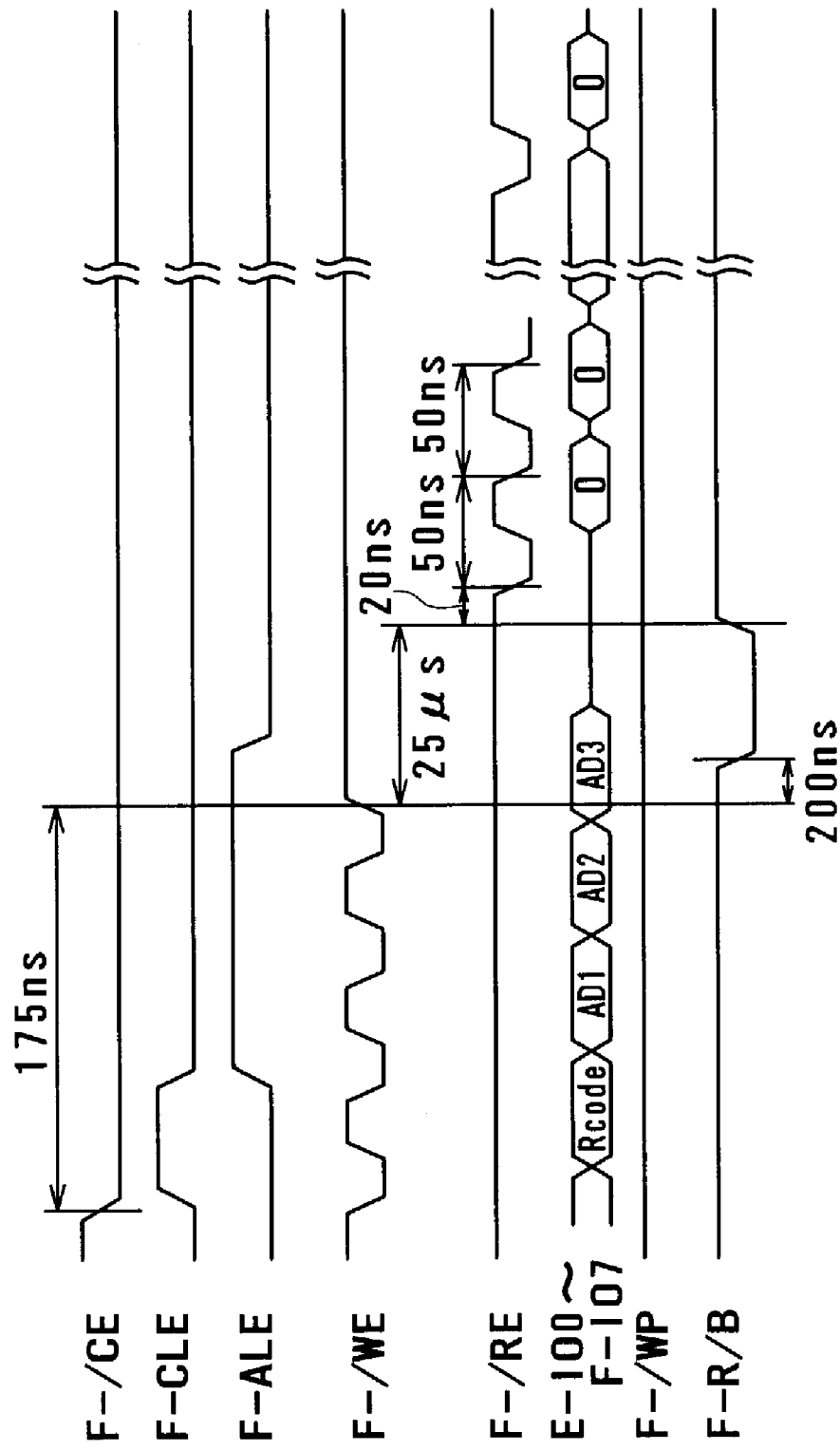
FIG. 21 is a timing chart illustrating an example of the timing of reading data from FLASH illustrated in FIG. 20.

FIG. 21 illustrates the operation of reading data from the NAND-type flash memory constituting CHIP1. When the chip enable signal F-/CE becomes Low; the command latch enable signal F-CLE becomes High; and the write enable signal F-/WE rises, a command code Rcode for read command is inputted through input/output signals F-IO0 to F-IO7. When thereafter, the address latch enable signal F-ALE becomes High and the second, third, and fourth write enable signals F-/WE rise, a page address is inputted through input/output signals F-IO0 to F-IO7.

528-byte data corresponding to the inputted page address is transferred from the memory array MA to the data registers DATA-REG. While data is being transferred from the memory array MA to the data registers DATA-REG, the flash memory is busy and the ready/busy circuit R/B makes the ready/busy signal F-R/B Low. When the data transfer completes, data in the data registers DATA-REGs is sequentially read by eight bits in synchronization with the falling edges of the read enable signal F-/RE and outputted through input/output signals F-IO0 to F-IO7.

Figure 22:
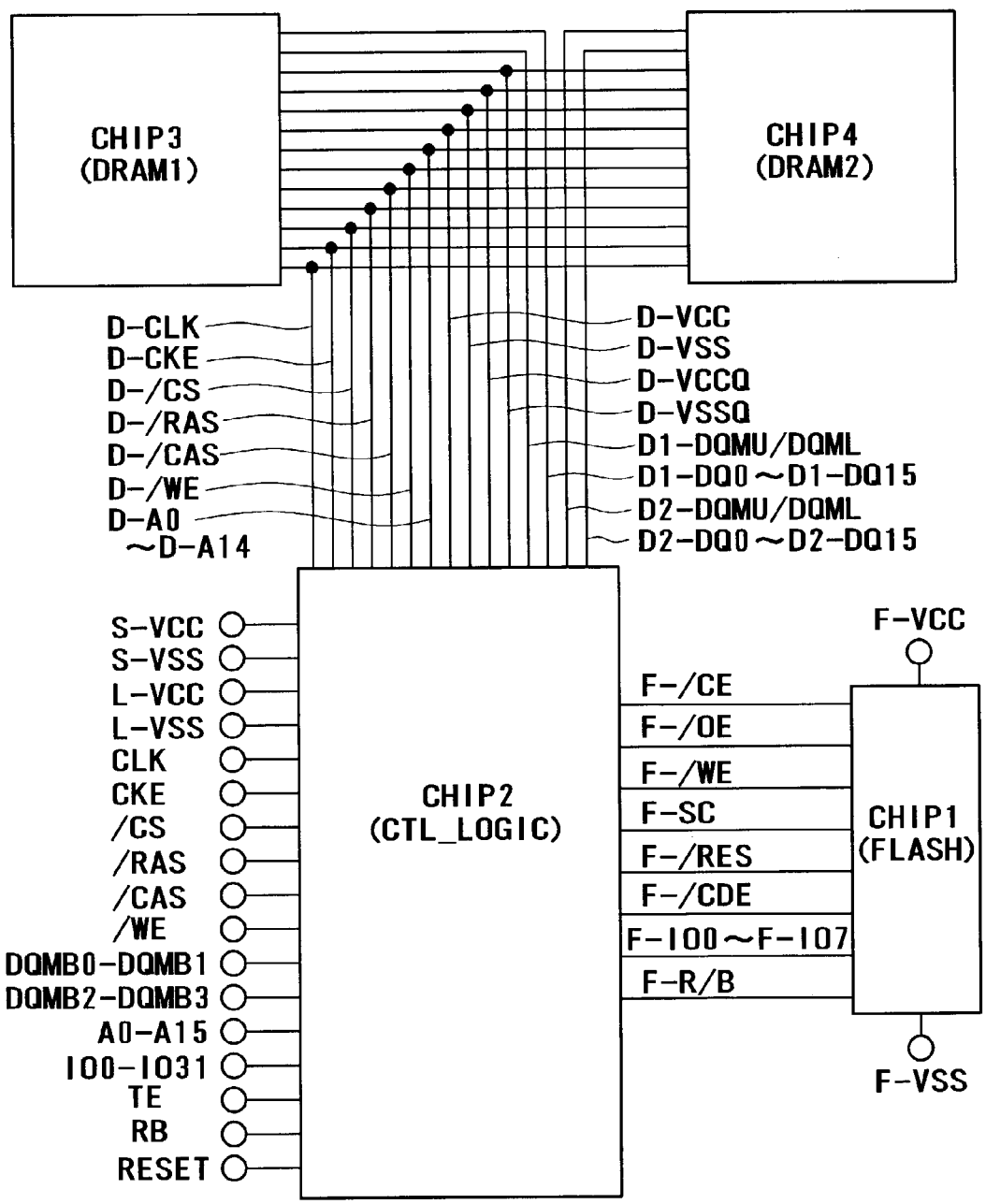
FIG. 22 is a drawing illustrating an example of the constitution of the memory module to which the present invention is applied.

FIG. 22 is a drawing illustrating an example of the constitution of the memory module with an AND-type flash memory used in CHIP1 (FLASH) of the memory module. As seen from the comparison with FIG. 1, some of the signals between CHIP1 (FLASH) and CHIP2 (CTL_LOGIC) in FIG. 22 are different from those in FIG. 1. More specifically, in FIG. 22, the command latch enable signal F-CLE, the address latch enable signal F-ALE, the read enable signal F-/RE, and the write protect signal F-WP which are found in FIG. 1 are omitted, and the output enable signal F-OE, the serial clock signal F-SC, the reset signal F-/RES, and the command data enable signal FCDE are provided instead.

Figure 23:
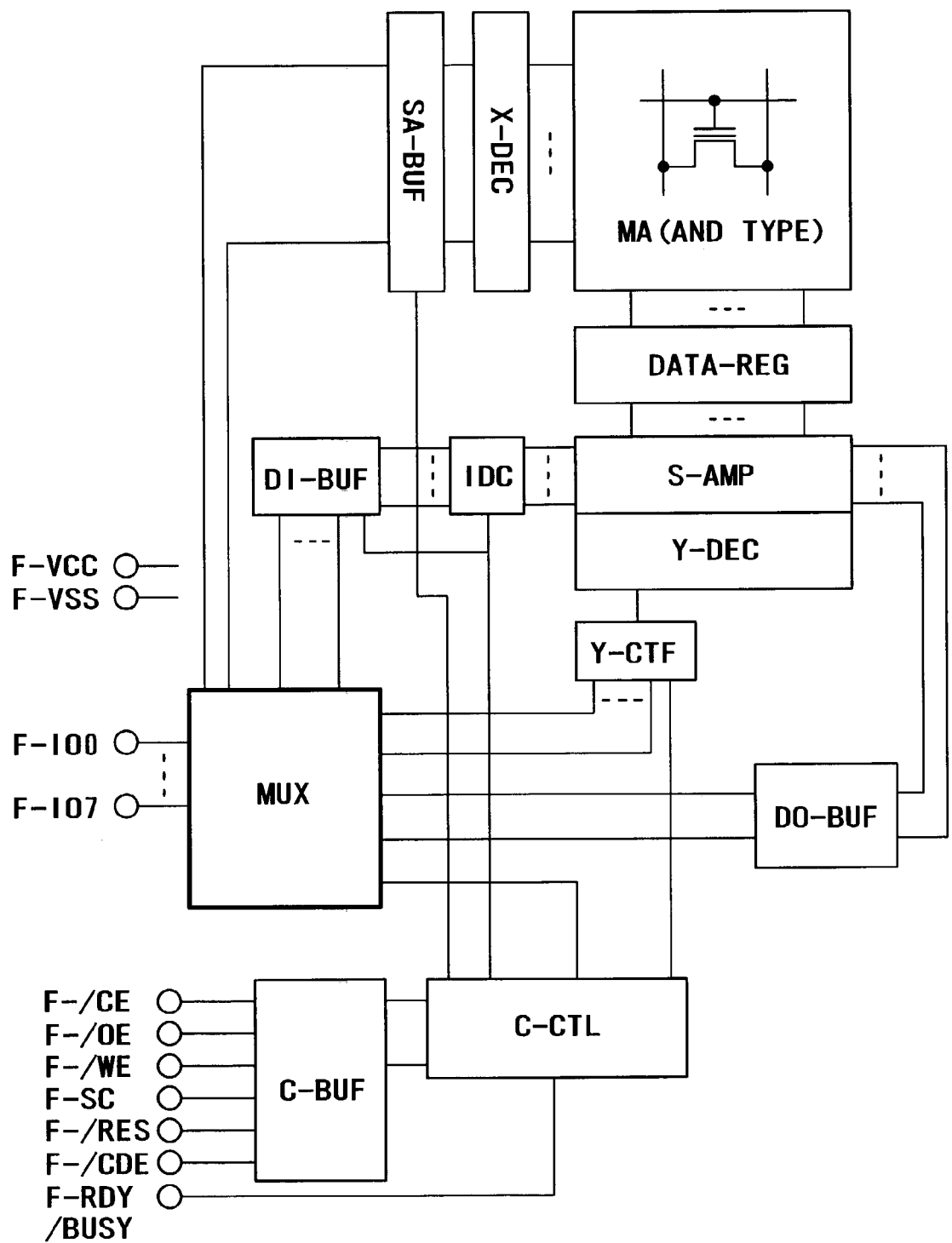
FIG. 23 is a block diagram illustrating an example of the constitution of FLASH illustrated in FIG. 22.

FIG. 23 is a block diagram illustrating an example of the constitution of an AND-type flash memory for use in the memory module.

The CHIP1 (FLASH) of the AND-type flash memory consists of various blocks, including a control signal buffer C-BUF, a command controller C-CTL, a multiplexer MUX, a data input buffer DI-BUF; an input data controller DC, a sector address buffer SA-BUF, an X decoder X-DEC, a memory array MA (FLASH), a Y address counter Y-CTF, a Y decoder Y-DEC, a sense amplifier circuit S-AMP, data registers DATA-REG, and a data output buffer DO-BUF. The CHIP1 operates in the same manner as AND-type flash memories conventionally in wide use. The memory module in this embodiment can be constituted using this CHIP1 (FLASH).

FIG. 24 illustrates the operation of reading data from the AND-type FLASH memory constituting CHIP1.

When the chip enable signal F-/CE becomes Low, the command data enable signal F-CDE becomes Low, and the write enable signal F-/WE rises, a command code Rcode for read command is inputted through input/output signals F-IO0 to F-IO7. When the second and third write enable signals F-/WE rise, a sector address is inputted through input/output signals F-IO0 to F-IO7.

2-kByte of data corresponding to the inputted sector address is transferred from the memory array MA to the data registers DATA-REG. While data is being transferred from the memory array MA to the data registers DATA-REG, FLASH is busy and the F-RDY/BUSY is Low. When the data transfer completes, data in the data registers DATA-REG is sequentially read by eight bits in synchronization with the rising edges of the serial clock signal F-SC and outputted through input/output signals F-IO0 to FIO7.

Figure 25:
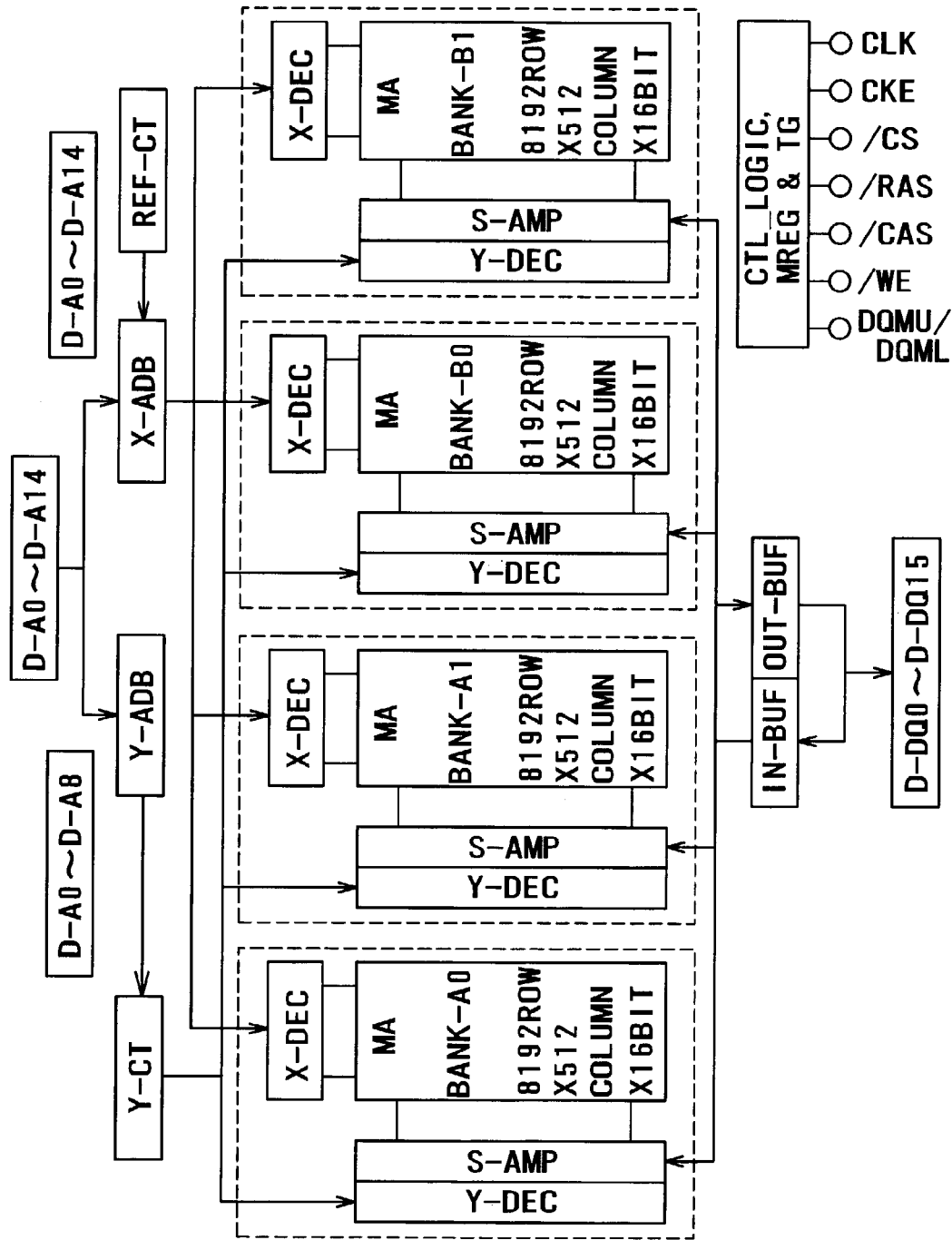
FIG. 25 is a block diagram illustrating an example of the constitution of DRAMs.

FIG. 25 is a block diagram illustrating an example of the constitution of the DRAMs in this embodiment. The DRAMs consist of an X address buffer X-ADB, a refresh counter REF-CT, X decoders X-DEC, memory arrays MA, a Y address buffer Y-ADB, a Y address counter Y-CT, Y decoders Y-DEC, sense amplifier circuits S-AMP, an input data buffer circuit IN-BUF, an output data buffer circuit OUT-BUF, a control circuit CTL_LOGIC, mode registers MREG, and a timing generation circuit TG.

The DRAMs are general purpose SDRAMs-conventionally used. More specifically, the DRAMs includes four memory banks, BANK-A0, BANK-A1, BANK-B0, and BANK-B1, each of which can operate independent of the others, and address input terminals and data input/output terminals are shared among them and used on a bank-by-bank basis in time-shared manner. The memory module in this embodiment can be constituted using these DRAMs.

Figure 26:
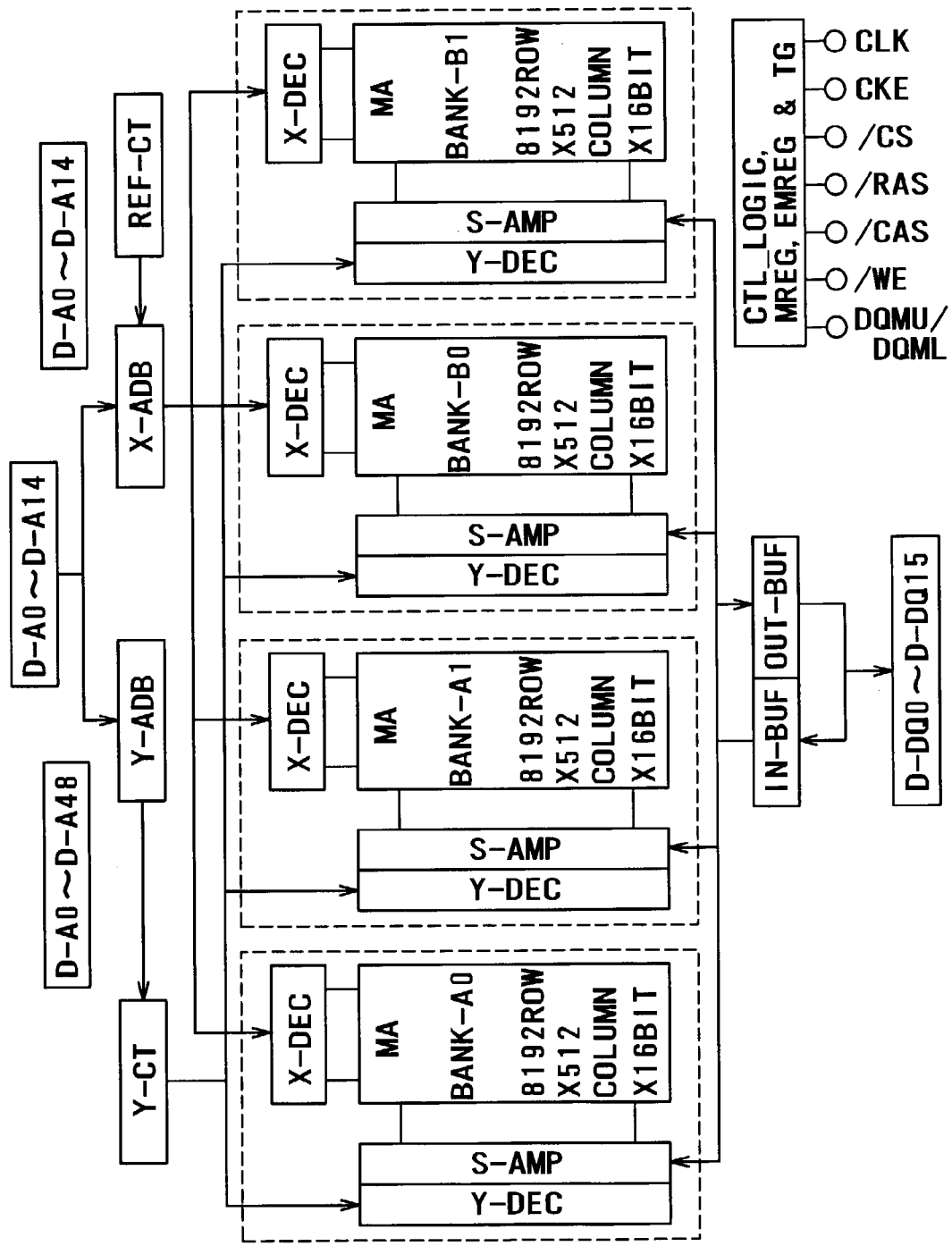
FIG. 26 is a block diagram illustrating another example of the constitution of DRAMs.

FIG. 26 is a block diagram illustrating another example of the constitution of the DRAMs in this embodiment. The DRAMs consist of an X address buffer X-ADB, a refresh counter REF-CT, X decoders X-DEC, memory arrays MA, a Y address buffer Y-ADB, a Y address counter Y-CT, Y decoders Y-DEC, sense amplifier circuits S-AMP, an input data buffer circuit IN-BUF, an output data buffer circuit OUT-BUF, a control circuit CTL_LOGIC, mode registers MREG, extended mode registers EMREG, and a timing generation circuit TG.

The DRAMs are obtained by adding extended mode registers EMREG to general purpose SDRAMs conventionally used so that change of data retention area during self refresh and to guaranteed temperature range and change of the drive performance of output buffer can be possible. Therefore, optimum setting can be made to the service environment, and the memory module in this embodiment can be constituted using these DRAMs.

As described above, in the memory module of the present invention, an area to which part or all of data in FLASH can be copies based on the SDRAM interface method is ensured in DRAMs, and data is transferred from FLASH to DRAMs in advance. As a result, data in FLASH can be read at the same speed as that in DRAMs. To write data into FLASH, the data can be once written into DRAMs and can be written back to FLASH as required. As a result, data writing speed is also the same as in DRAMs.

In reading from FLASH within the memory module, error detection and correction is performed. In writing, replacement processing is performed for any defect address at which writing is not correctly performed. As a result, the processing speed is enhanced and the high reliability is maintained.

Since large-capacity DRAMs are used, a large-capacity work area is ensured in addition to the area to which data in FLASH can be copied, and this makes it possible to cope with needs for the enhancement of the performance of cellular phones.

Even when data transfer between FLASH and DRAMs according to a load command or store command is in progress within the memory module, DRAMs are accessible from the outside of the memory module without paying attention to the data transfer, and this makes it possible to cope with needs for the enhancement of the performance of portable devices.

Since data transfer between FLASH and DRAMs according to a load command or store command can be effected in the background, as mentioned above, it is possible to transfer only required data to from FLASH to and from DRAMs to FLASH before due time. This also makes it possible to cope with needs for the enhancement of the performance of portable devices.

Since any value from 1 to 256 can be set for the burst length of the memory module, a burst length suitable for the specifications for a portable device which uses the present memory module can be flexibly selected.

Since the required program is automatically transferred from FLASH to DRAMs when power is turned on, the memory module becomes accessible as soon as the portable device is started up. This also makes it possible to cope with needs for the enhancement of the performance of portable device.

Further, since the initial program area specification data can be rewritten to change the data transfer size at power-on, the requirements of portable devices can be flexibly met to enhance the performance thereof.

After the completion of transfer of the initial program from FLASH to DRAMs after power-on, DRAMs are brought into self refresh state. As a result, data can be retained in DRAMs with low power until a command to cancel the self refresh state is inputted through address signals (A0 to A15) and command signals COM. Further, refresh control can be quickly and accurately switched.

Since the power supply can be controlled with the compatibility of SDRAMs interfaces maintained, the power supply to DRAMs may be interrupted when data need not be retained in DRAMs and thus the power consumption of the memory module can be reduced. Further, power can be supplied to DRAMs by the power-on command for DRAMs and thus DRAMs can be quickly used again.

<Embodiment 2>

Figure 27A:
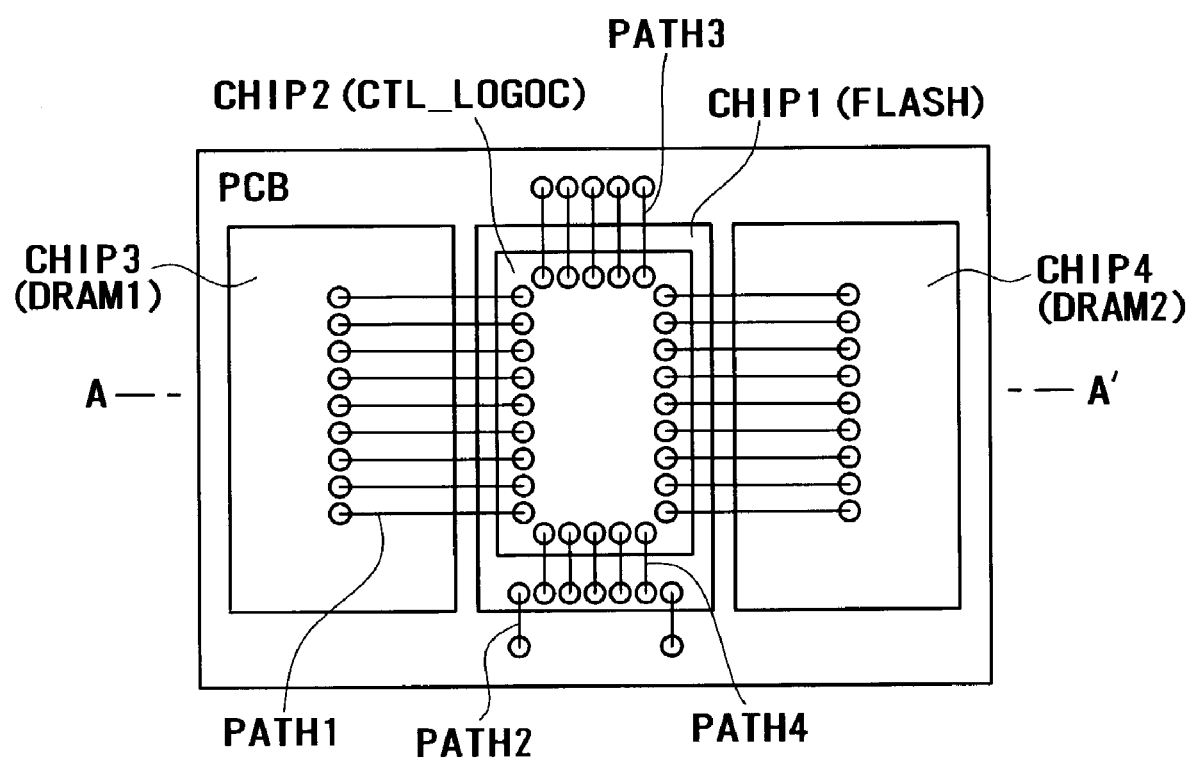
FIG. 27A is a drawing illustrating an embodiment of the memory module of the present invention.
Figure 27B:
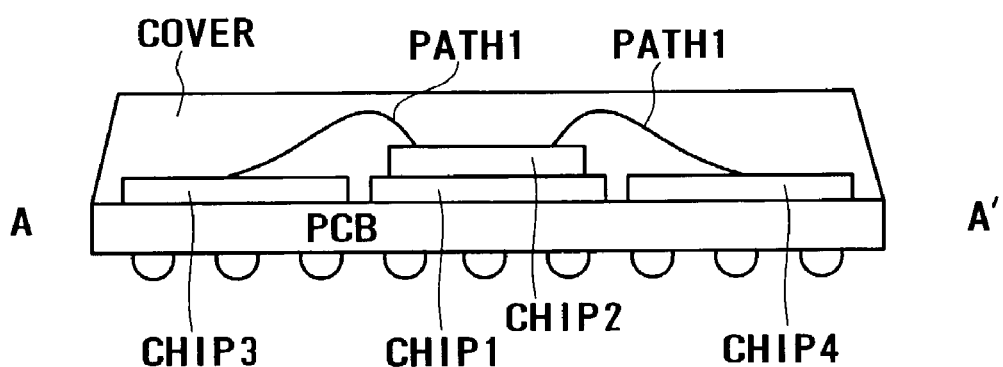
FIG. 27B is a drawing illustrating the cross-sectional view of the embodiment illustrated in FIG. 27A.

FIGS. 27A and 27B illustrate a second embodiment of a memory module to which the memory system of the present invention is applied. FIG. 27A is a top view of the memory module and FIG. 27B is a cross-sectional view taken along the line A–A' of the top view.

In the memory module in this embodiment, CHIP1 (FLASH), CHIP2 (CTL_LOGIC), CHIP3 (DRAM1) and CHIP4 (DRAM2) are mounted on a board PCB (for example, printed circuit board composed of a glass-epoxy substrate) which board is to be mounted on a device through ball grid array (BGA). A bare chip of general purpose DRAM wherein signal and power supply pads are arranged in line in the center of the so-called chip is used for CHIP3 and CHIP4, without confinement thereto. A general purpose bare chip of FLASH wherein signal and power supply pads are arrange in line at one end of the so-called chip is used for CHIP1, without confinement thereto.

The bonding pads on CHIP1 and the bonding pads on the board PCB are connected with each other through bonding wires (PATH2), and the bonding pads on CHIP2 and the bonding pads on PCB are connected with each other through bonding wires (PATH3). CHTP3 and CHP4 are connected with CHIP2 through bonding wires (PATH1).

CHIP1 and CHIP2 are connected with each other through bonding wires (PATH4). The upper face of the board PCB mounted with the chips is resin-molded to protect the chips and the connecting wires. A cover (COVER) of metal, ceramic, or resin may be additionally placed thereon.

In this embodiment, the bare chips are mounted directly on the printed circuit board PCB, and thus a memory module with a less mounting area is obtained. Further, since the chips can be placed in proximity to one another, the length of the wiring between the chips can be reduced. By using the bonding wire method both for the wiring between the chips and for the wiring between each chip and the board, the memory module can be manufactured with a less number of processes.

Further, by directly connecting the chips using bonding wires, the number of the bonding pads on the board and the number of bonding wires can be reduced and the memory module can be manufactured with a less number of processes. Since mass-produced bare chips of general purpose DRAMs can be used, the inexpensive memory module can be supplied with stability. If a resin cover is used, the robustness of the memory module can be enhanced. If a cover of ceramic or metal is used, the memory module excellent in characteristics of heat radiation and shield effect as well as strength can be obtained.

Figure 28A:
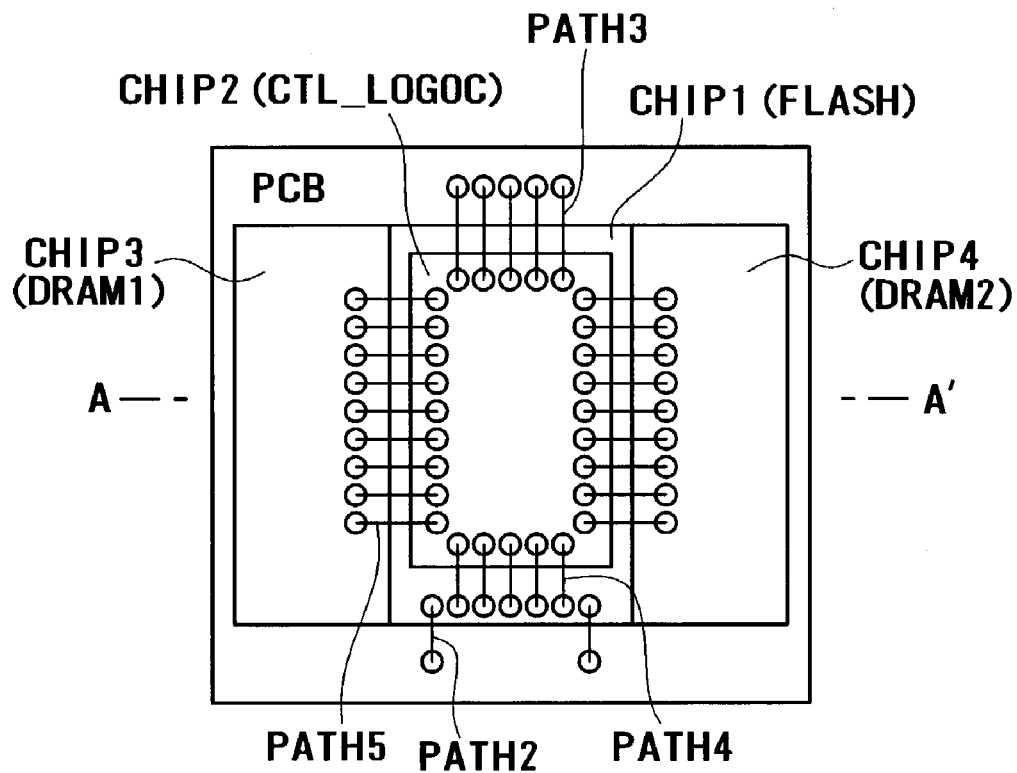
FIG. 28A is a drawing illustrating a modification to the embodiment of the memory module of the present invention.
Figure 28B:
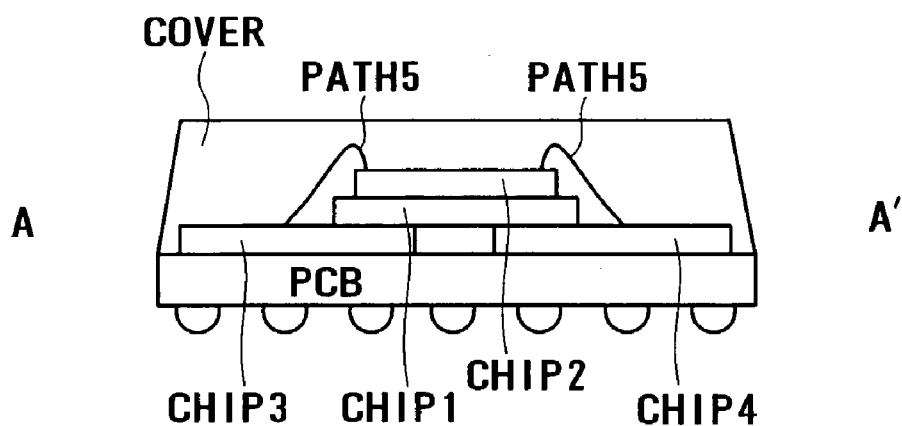
FIG. 28B is a drawing illustrating the cross-sectional view of the modification illustrated in FIG. 28A.

FIGS. 28A and 28B illustrate a modification to the constitution of the memory module illustrated in FIGS. 27A and 27B. FIG. 28A is a top view of the modification and 28B is a cross-sectional view taken along the line A–A' of the top view.

In this modification, CHIP1 (CTL_LOGIC) is placed on CHIP3 and CHIP4. Bonding wires are used for the wiring (PATH5) between CHIP2 and CHIP3 and between CHIP2 and CHIP4. The bonding pads on CHIP1 and the bonding pads on the board PCB are connected with each other through bonding wires (PATH2), and the bonding pads on CHIP2 and the bonding pads on the board PCB are connected with each other through bonding wires (PATH3). CHIP1 and CHIP2 are connected with each other through bonding wires (PATH4).

This method for mounting allows reduction in the area of the printed circuit board PCB. Further, the wiring PATH5 between the stacked chips makes it possible to shorten the wiring length, and this enhances the reliability of the wiring and reduces noise radiated to the outside.

<Embodiment 3>

Figure 29:
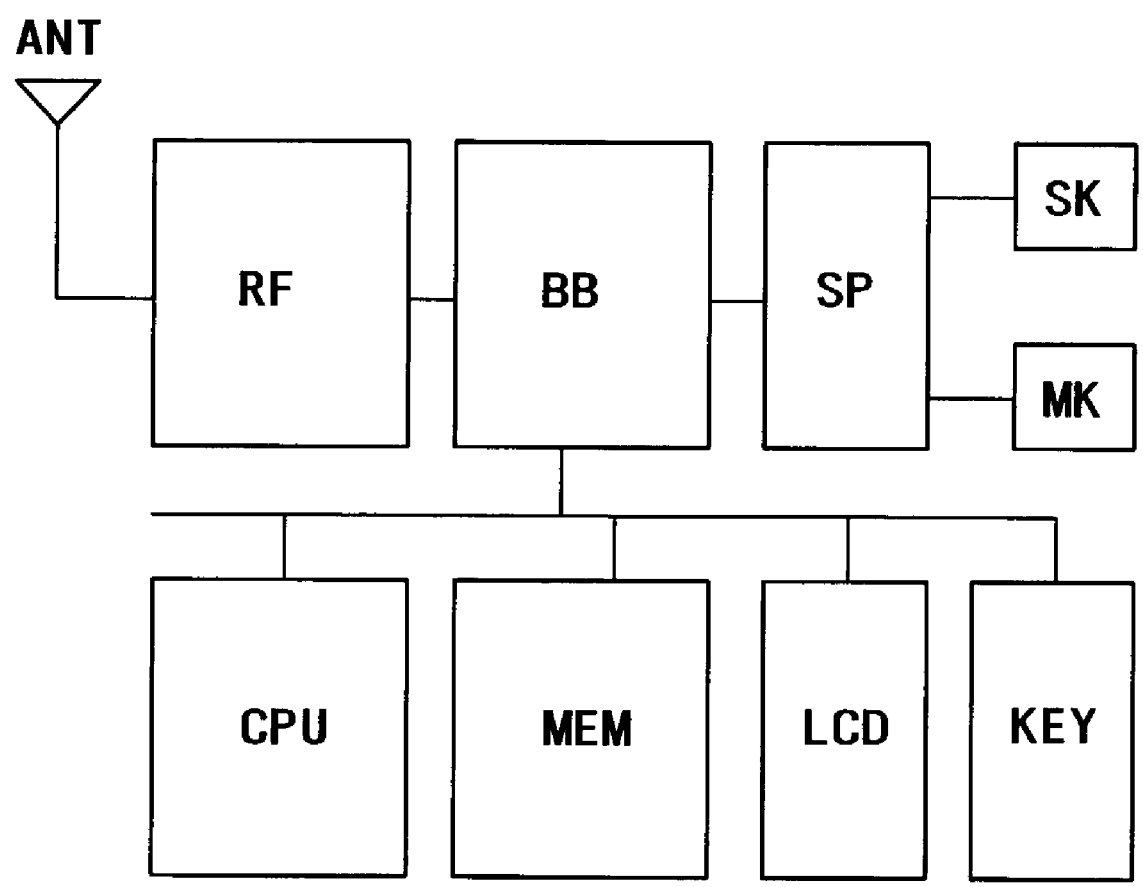
FIG. 29 is a block diagram illustrating an example of the constitution of a cellular phone utilizing the memory module of the present invention.

FIG. 29 illustrates an embodiment of a cellular phone using a memory module to which the memory system of the present invention is applied to. The cellular phone consists of an antenna ANT, a radio block RF, a base band block BB, a speech codec block SP, a speaker SK, a microphone MK, a processor CPU, a liquid crystal display LCD, a keyboard KEY, and the memory module MEM described in Embodiment 1 or 2.

The operation performed during a telephone call will be described.

Speech received through the antenna ANT is amplified through the radio block RF and inputted to the base band block BB. In the base band block BB, the analog signal of speech is converted into a digital signal and error correction and decoding is performed, and the signal is outputted to the speech codec block SP. The speech codec block converts the digital signal into an analog signal and outputs the signal to the speaker SK. Thus, the voice of the party on the other end is heard through the speaker.

The operation performed when the user performs a series of operations, including accessing a Web site from the cellular phone, downloading music data, reproducing and listening to the music, and finally storing the downloaded music data.

An operating system and application programs (e.g. e-mail software, Web browser, music reproducing software, game software) are stored in the memory module MEM.

When an instruction to start up the Web browser is given through the keyboard, the program of the Web browser stored in FLASH in the memory module MEM is transferred to DRAMs in the same memory module. When the transfer to DRAMs comletes, the program of the Web browser in DRAMs is executed by the processor CPU, and the Web browser is displayed on the liquid crystal display LCD. When the user accesses a desired Web site and gives an instruction to download favorite music data through the keyboard KEY, the music data is received through the antenna ANT, amplified through the radio block RF, and inputted to the base band block BB. In the base band block BB, the music data as an analog signal is converted into a digital signal, and error correction and decoding is performed. Finally, the digitized music data is stored in DRAMs in the memory module MEM and then transferred to FLASH.

When an instruction to start the music reproducing program is given through the keyboard KEY, the music reproducing program stored in FLASH in the memory module MEM is transferred to DRAMs in the same memory module. When the transfer to DRAMs completes, the processor CPU executes the music reproducing program in DRAMs and the music reproducing program is displayed on the liquid crystal display LCD.

When the user gives an instruction required to listen to the music data downloaded to the DRAMs through the keyboard KEY, the processor CPU executes the music reproducing program and processes the music data stored in DRAMs. As a result, the music is heard through the speaker SK.

Since the memory module of the present invention uses large-capacity DRAMs, the Web browser and the music reproducing program are retained in DRAMs and both the programs are simultaneously executed by CPU. Further, it is possible to simultaneously start up the e-mail program to send and receive mail.

Even if the Web browser is exited, the browser can be immediately restarted because the browser is retained in DRAMs in the memory module.

When an instruction to interrupt power supply is inputted through the keyboard, the memory module allows only SRAMs to operate to retain minimum required data and thus the power consumption is minimized.

As mentioned above, use of a memory module to which the memory system of the present invention is applied makes it possible to store mass mailings, music reproducing and application programs, music data, static image data, moving image data, and the like, and to simultaneously execute a plurality of programs.

Other Embodiments

The present invention includes, but is not limited, the following additional embodiments of the present invention.

A semiconductor memory device is provided that comprises a dynamic random access memory formed on a first semiconductor chip, wherein the dynamic random access memory includes a plurality of memory banks, wherein the dynamic random access memory is configured to receive clock signals and address signals, wherein the clock signals and the address signals originate from outside of the first semiconductor chip, wherein the clock signals have a clock cycle, wherein a minimum time interval to access one memory bank of the plurality of memory banks after another memory bank of the plurality of memory banks is accessed is 2 times the clock cycle or more.

Alternatively, the semiconductor memory device further comprises a control circuit configured to change the minimum time interval, wherein the change is configured to be controlled by a terminal external to the control circuit.

Alternatively, the control circuit is formed on a second semiconductor chip, wherein the second semiconductor chip includes an interface of a synchronous dynamic random access memory.

Alternatively, the dynamic random access memory is further configured to perform a data transfer with a nonvolatile memory, wherein the dynamic random access memory is further configured to be accessible from outside of the dynamic random access memory during the data transfer without accounting for the data transfer.

Alternatively, the dynamic random access memory is accessible from outside of the dynamic random access memory due to use of the minimum time interval.

Alternatively, the semiconductor device is configured to be used in a portable communication device.

Alternatively, the data transfer is carried out according to at least one of a load command and a store command.

Alternatively, the data transfer is carried out before a given time of a regular data transfer that would take place without use of the minimum time interval.

EFFECTS OF THE PRESENT INVENTION

As mentioned above, effects brought about by the present invention are, but are not limited to, as follows:

First, in a memory module to which the memory system of the present invention is applied, an area to which part or all of data in FLASH can be copied is ensured in DRAMs and data is transferred from FLASH to DRAMs in advance, and thereby data in FLASH can be read or written at the same speed as that in DRAMs.

Second, in reading from FLASH within the memory module, error detection and correction is performed. In writing, replacement processing is performed for a defect address at which writing is not correctly performed. This enhances the processing speed and the reliability of processing.

Third, since the memory module uses large-capacity DRAMs, a large-capacity work area can be ensured in addition to the area to which data in FLASH can be copied, and this makes it possible to cope with needs for the enhancement of the performance of cellular phones.

Fourth, even when data transfer between FLASH and DRAMs according to a load command or store command is in progress within the memory module, DRAMs are accessible from the outside of the memory module without paying attention to the data transfer. This makes it possible to cope with needs for the enhancement of the performance of portable devices.

Fifth, since any value from 1 to 256 can be set for the burst length of the memory module, a burst length suitable for the specifications for a portable device which uses the present memory module can be flexibly selected.

Sixth, since the required program is automatically transferred from FLASH to DRAMs when power is turned on, the memory module becomes accessible as soon as the portable device is started up. This also makes it possible to cope with needs for the enhancement of the performance of portable devices.

Further, since the initial program area specification data can be rewritten to change the size of data transferred at power-on, the requirements of portable devices can be flexibly met, and this also contributes to the enhancement of the performance of the devices.

Seventh, after the completion of transfer of the initial program from FLASH to DRAMs after power-on, DRAMs are brought into self refresh state. As a result, data can be retained in DRAMs with low power until a command to cancel the self refresh state is inputted through address signals (A0 to A15) and command signals COM. Further, refresh control can be quickly and accurately switched.

Eighth, since the power supply can be controlled with the compatibility of SDRAM interfaces maintained, the power supply to DRAMs may be interrupted when data need not be retained in DRAMs and thus the power consumption of the memory module can be reduced. Further, power can be supplied to DRAMs by the power-on command for DRAMs and thus DRAMs can be quickly used again.

Ninth, a plurality of semiconductor chips are packaged in one sealing body, and a memory module with a less mounting area is obtained.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A memory system comprising:
   a nonvolatile memory;
   synchronous dynamic random access memories;
   circuits including a control circuit which is coupled with the nonvolatile memory and the synchronous dynamic random access memories, and controls accesses to the nonvolatile memory and the synchronous dynamic random access memories; and
   a plurality of input/output terminals coupled with the circuits, wherein in data transfer from the nonvolatile memory to the synchronous dynamic random access memories, error corrected data is transferred,
   wherein a bank active command externally inputted through the input/output terminals is outputted to the synchronous dynamic random access memories with a latency period of 2 clock cycles or longer, and the latency period is programmable.

2. The memory system of claim 1, wherein with the latency period, the issuance of read and write commands to the synchronous dynamic random access memories for data transfer between the nonvolatile memory and the synchronous dynamic random access memories is temporarily stopped and the bank active command externally inputted through the input/output terminals is enabled.

3. The memory system of claim 1, wherein programming of the latency period can be externally performed through the input/output terminals.

4. The memory system of claim 1, wherein reading and writing operations are performed with a burst length which is an integral multiple of a burst length set for the synchronous dynamic random access memories.

5. The memory system of claim 1, wherein the nonvolatile memory is a NAND-type flash memory.

6. The memory system of claim 1, wherein the nonvolatile memory is formed on a first semiconductor chip, wherein the circuits are formed on a second semiconductor chip, wherein one part of the synchronous dynamic random access memories is formed on a third semiconductor chip, wherein another part of the synchronous dynamic random access memories is formed on a fourth semiconductor chip, wherein the memory system is a multichip memory module, wherein the first, the second, the third, and the fourth semiconductor chips are mounted and sealed on a circuit board.

7. The memory system of claim 1, wherein data for setting mode registers and extended mode registers provided in the synchronous dynamic random access memories is retained.

8. The memory system of claim 7, wherein, when operating power is turned on, mode register set and extended mode register set operations are initially performed to set data in the mode registers and the extended mode registers provided in the synchronous dynamic random access memories.

9. The memory system of claim 1, wherein the nonvolatile memory is an AND-type flash memory.

10. The memory system of claim 1, wherein the control circuit has an error correction circuit.

11. The memory system of claim 10, wherein the control circuit has an address replacement circuit.

12. A memory system comprising:
a nonvolatile memory;
synchronous dynamic random access memories;
circuits including a control circuit which is coupled with the nonvolatile memory and the synchronous dynamic random access memories and controls accesses to the nonvolatile memory and the synchronous dynamic random access memories; and
a plurality of input/output terminals coupled with the circuits, wherein transfer range data indicating the range of data initially transferred from the nonvolatile memory to the synchronous dynamic random access memories when operating power is turned on is retained in the nonvolatile memory, wherein the transfer range data retained in the nonvolatile memory is read out of the nonvolatile memory, and data in the nonvolatile memory in the range indicated by the transfer range data read out is initially transferred to the synchronous dynamic random access memories when operating power is turned on and retained therein, and the synchronous dynamic random access memories are kept in self refresh state immediately after the data transfer from the nonvolatile memory to the synchronous dynamic random access memories initially performed when power is turned on completes.

13. The memory system of claim 12, wherein the transfer range data is programmable in the nonvolatile memory.

14. The memory system of claim 12, wherein auto refresh operation is performed on the synchronous dynamic random access memories when the data transfer from the nonvolatile memory to the synchronous dynamic random access memories initially performed when power is turned on is in progress.

15. The memory system of claim 12, wherein, after the completion of the data transfer, the synchronous dynamic random access memories are removed from self refresh state and data is read out of the synchronous dynamic random access memories.

* * * * *

UNITED STATES PATENT AND TRADEMARK OFFICE
CERTIFICATE OF CORRECTION

PATENT NO. : 7,136,978 B2  Page 1 of 1
APPLICATION NO. : 10/445922
DATED : November 14, 2006
INVENTOR(S) : Miura et al.

It is certified that error appears in the above-identified patent and that said Letters Patent is hereby corrected as shown below:

Title Page, item (73), before "Renesas" add -- Hitachi ULSI Systems Co., Ltd. --

Signed and Sealed this

Fourteenth Day of August, 2007

JON W. DUDAS
*Director of the United States Patent and Trademark Office*